United States Patent
Mitsumori et al.

(10) Patent No.: US 10,042,671 B2
(45) Date of Patent: Aug. 7, 2018

(54) NON-TRANSITORY COMPUTER-READABLE STORAGE MEDIUM, CONTROL DEVICE, AND CONTROL METHOD

(71) Applicant: FUJITSU LIMITED, Kawasaki-shi, Kanagawa (JP)

(72) Inventors: Keigo Mitsumori, Koube (JP); Yusuke Kuchiwaki, Nagoya (JP); Yukihiro Takeuchi, Akashi (JP); Yutaka Arakawa, Kobe (JP); Haruhiko Tachibana, Kobe (JP); Shinji Nagasawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 105 days.

(21) Appl. No.: 15/376,788

(22) Filed: Dec. 13, 2016

(65) Prior Publication Data

US 2017/0168869 A1 Jun. 15, 2017

(30) Foreign Application Priority Data

Dec. 15, 2015 (JP) ................................. 2015-244050

(51) Int. Cl.
*G06F 9/46* (2006.01)
*G06F 9/48* (2006.01)
*G06F 17/30* (2006.01)

(52) U.S. Cl.
CPC ...... *G06F 9/4843* (2013.01); *G06F 17/30286* (2013.01)

(58) Field of Classification Search
None
See application file for complete search history.

(56) References Cited

U.S. PATENT DOCUMENTS

| | | | | |
|---|---|---|---|---|
| 2005/0086647 A1* | 4/2005 | Ito | ............................ | G06F 8/75 717/132 |
| 2006/0017952 A1* | 1/2006 | Ataka | ................... | G06F 3/1204 358/1.13 |
| 2007/0121150 A1* | 5/2007 | Kobayashi | ......... | H04N 1/32106 358/1.15 |
| 2015/0356141 A1* | 12/2015 | Yan | ................... | G06F 17/30454 707/714 |
| 2016/0162478 A1* | 6/2016 | Blassin | ............ | G06Q 10/06311 706/12 |
| 2016/0283610 A1* | 9/2016 | Simitsis | ............ | G06F 17/30958 |

FOREIGN PATENT DOCUMENTS

| | | |
|---|---|---|
| JP | 2008-140407 | 6/2008 |
| JP | 2009-181494 | 8/2009 |
| JP | 2009-245383 | 10/2009 |

* cited by examiner

*Primary Examiner* — Sisley Kim
(74) *Attorney, Agent, or Firm* — Fujitsu Patent Center

(57) ABSTRACT

A non-transitory computer-readable storage medium storing a control program that causes a computer to execute a process, the process including obtaining, for each of a plurality of job flows to which coincident input data is inputted, data excluded from the coincident input data of each of the plurality of job flows by a data extraction process or information specifying the excluded data, each of the plurality of job flows defining a plurality of processes including the data extraction process to be executed, and determining whether the plurality of job flows whose output data are coincident each other are aggregated or not based on the excluded data or the information specifying the excluded data.

8 Claims, 22 Drawing Sheets

FIG. 7

| MASTER DATA | | | M1 |
|---|---|---|---|
| STORE NAME | GOODS NAME | SALES AMOUNT | |
| N1 | R1 | 10 MILLION | |
| N2 | R2 | 10 MILLION | |
| N3 | R3 | 10 MILLION | |
| N1 | R1 | 10 MILLION | |
| N2 | R2 | 10 MILLION | |
| N3 | R3 | 10 MILLION | |
| ... | ... | ... | |

FIG. 8

| AGGREGATION CANDIDATE MANAGEMENT TABLE || 121 |
|---|---|
| JOB FLOW NAME | GROUP NAME |
| JOB FLOW JA | GROUP G1 |
| JOB FLOW JB | GROUP G1 |
| JOB FLOW JC | GROUP G1 |
| JOB FLOW JD | GROUP G1 |
| JOB FLOW JE | GROUP G2 |
| JOB FLOW JF | GROUP G3 |
| ... | ... |

FIG. 9

| NUMBER-OF-DELETED-RECORDS TABLE | 122 |
|---|---|
| JOB FLOW NAME | NUMBER OF DELETED RECORDS |
| JOB FLOW JA | 70 |
| JOB FLOW JB | 70 |
| JOB FLOW JC | 70 |
| JOB FLOW JD | 1000 |
| ... | ... |

FIG. 10

EXAMPLE OF DELETED DATA
MANAGEMENT INFORMATION

DELETED DATA TABLE OF JOB FLOW JA

| STORE NAME | GOODS NAME | SALES AMOUNT |
|---|---|---|
| N2 | R2 | 10 MILLION |
| N3 | R3 | 39.99 MILLION |
| N2 | R2 | 24.99 MILLION |
| ... | ... | ... |

DELETED DATA TABLE OF JOB FLOW JB

| STORE NAME | GOODS NAME | SALES AMOUNT |
|---|---|---|
| N1 | R2 | 10 MILLION |
| N3 | R1 | 39.99 MILLION |
| N2 | R3 | 24.99 MILLION |
| ... | ... | ... |

DELETED DATA TABLE OF JOB FLOW JC

| STORE NAME | GOODS NAME | SALES AMOUNT |
|---|---|---|
| N2 | R2 | 10 MILLION |
| N3 | R3 | 39.99 MILLION |
| N2 | R2 | 24.99 MILLION |
| ... | ... | ... |

DELETED DATA TABLE OF JOB FLOW JD

| STORE NAME | GOODS NAME | SALES AMOUNT |
|---|---|---|
| N1 | R2 | 10 MILLION |
| N4 | R1 | 45.26 MILLION |
| N6 | R3 | 24.99 MILLION |
| ... | ... | ... |

FIG. 11

| PROCESS-SAME-DETERMINATION MANAGEMENT TABLE | | | | | 124 |
|---|---|---|---|---|---|
| TIME / JOB FLOW NAME | JOB FLOW JA | JOB FLOW JB | JOB FLOW JC | JOB FLOW JD | |
| 2015/08/16 07:00 | TRUE | TRUE | TRUE | TRUE | |
| 2015/08/17 07:00 | TRUE | TRUE | TRUE | TRUE | |
| 2015/08/18 07:00 | TRUE | TRUE | TRUE | TRUE | |
| 2015/08/25 07:00 | TRUE | FALSE | TRUE | FALSE | |
| ... | ... | ... | ... | ... | |
| 2015/08/27 07:00 | TRUE | FALSE | TRUE | TRUE | |
| 2015/08/28 07:00 | TRUE | TRUE | TRUE | FALSE | |
| ... | ... | ... | ... | ... | |

FIG. 17A

DELETED DATA TABLE OF JOB FLOW JA — 123a

| STORE NAME | GOODS NAME | SALES AMOUNT |
|---|---|---|
| B | Y | 10 MILLION |
| C | Z | 39.99 MILLION |
| B | Y1 | 24.99 MILLION |
| ... | ... | ... |

DELETED DATA TABLE OF JOB FLOW JB — 123e

| STORE NAME | GOODS NAME |
|---|---|
| B | Y |
| C | X |
| B | Y2 |
| ... | ... |

FIG. 17B

DELETED RECORDS OF JOB FLOW JA — R11

| STORE NAME | GOODS NAME | SALES AMOUNT |
|---|---|---|
| B | Y | 10 MILLION |

⇔ COINCIDENCE

DELETED RECORDS OF JOB FLOW JB — R21

| STORE NAME | GOODS NAME |
|---|---|
| B | Y |

FIG. 17C

DELETED RECORDS OF JOB FLOW JA — R12

| STORE NAME | GOODS NAME | SALES AMOUNT |
|---|---|---|
| B | Y1 | 10 MILLION |

⇔ DIFFERENCE

DELETED RECORDS OF JOB FLOW JB — R22

| STORE NAME | GOODS NAME |
|---|---|
| B | Y2 |

FIG. 19
| PROCESS-SAME-DETERMINATION MANAGEMENT TABLE | | | | | 124 |
|---|---|---|---|---|---|
| DATE \ JOB FLOW NAME | JOB FLOW JA | JOB FLOW JB | JOB FLOW JC | JOB FLOW JD | |
| 2015/08/16 07:00 | TRUE | TRUE | TRUE | TRUE | |
| 2015/08/17 07:00 | TRUE | TRUE | TRUE | TRUE | |
| 2015/08/18 07:00 | TRUE | TRUE | TRUE | TRUE | |
| 2015/08/25 07:00 | TRUE | FALSE | TRUE | FALSE | |
| ... | ... | ... | ... | ... | |
| 2015/08/27 07:00 | TRUE | FALSE | TRUE | FALSE | |
| 2015/08/28 07:00 | TRUE | FALSE | TRUE | TRUE | |
| ... | ... | ... | ... | ... | |
JOB FLOWS JA AND JC ARE TYPICALLY SAME
AGGREGATE JOB FLOWS JA AND JC

NON-TRANSITORY COMPUTER-READABLE STORAGE MEDIUM, CONTROL DEVICE, AND CONTROL METHOD

CROSS-REFERENCE TO RELATED APPLICATION

This application is based upon and claims the benefit of priority of the prior Japanese Patent Application No. 2015-244050, filed on Dec. 15, 2015, the entire contents of which are incorporated herein by reference.

FIELD

The embodiments discussed herein are related to a non-transitory computer-readable storage medium, a control device, and a control method.

BACKGROUND

In an information processing system, an execution target process is managed by a unit called a job and a series of jobs are managed by a unit called job flow. The job flow includes the processing content of each of a plurality of jobs or information about an execution sequence of each job. An execution of a series of the jobs is automatized by the job flow so as to make it possible to efficiently operate the information processing system.

In the system operation and management, maintenance may be performed on the job or the job flow which is already introduced. For example, a method for grasping how a program executed in the introduced job or a new job works on an output result when a new job is added to a job operated in a batch process in advance is suggested. In the suggested method, full scale introduction of a virtual job is determined in a case where the content of an output file of an actual job is the same that of an output file of a virtual job obtained by adding a new job to the actual job or a difference between the output files corresponds to an expected one when comparing the output file of the actual job with that of the virtual job.

Japanese Laid-Open Patent Publication No. 2009-245383 is an example of related art.

SUMMARY

According to an aspect of the invention, a non-transitory computer-readable storage medium storing a control program that causes a computer to execute a process, the process including obtaining, for each of a plurality of job flows to which coincident input data is inputted, data excluded from the coincident input data of each of the plurality of job flows by a data extraction process or information specifying the excluded data, each of the plurality of job flows defining a plurality of processes including the data extraction process to be executed, and determining whether the plurality of job flows whose output data are coincident each other are aggregated or not based on the excluded data or the information specifying the excluded data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of master data;

FIG. 8 is a diagram illustrating an example of an aggregation candidate management table;

FIG. 9 is a diagram illustrating an example of a number-of-deleted-records table;

FIG. 10 is a diagram illustrating an example of deleted-data management information;

FIG. 11 is a diagram illustrating an example of a process-same-determination management table;

FIGS. 17A, 17B, and 17C are diagrams illustrating an example of a deleted-data comparison method;

FIG. 19 is a diagram illustrating a specific example of the job flow aggregation process;

DESCRIPTION OF EMBODIMENTS

A plurality of job flows each of which performs the same process may be individually defined and used in an operation. For example, a case where systems installed respectively in a plurality of sites are incorporated in a single site or another system such as a data center is considered. In this case, when the job flow, which is prepared and executed in the system of each site, is continuously used in a business performed in each site even after being incorporated, a plurality of job flows performing the common process may be generated in a single system after the incorporation. When the plurality of job flows performing the common process are defined in the single system, a problem in a job flow management occurs in the system. For example, when a job flow maintenance is performed, if a plurality of job flows performing the common process exist, maintenance is not performed for each job flow but performed for the plurality of job and thus, a maintenance cost may be increased.

One aspect of the present disclosure is to provide a control program, a control device, and a control method that specify aggregatable job flows to be aggregated.

In the following, embodiments of the present disclosure will be described with reference to the accompanying drawings.

First Embodiment

Figure 1:
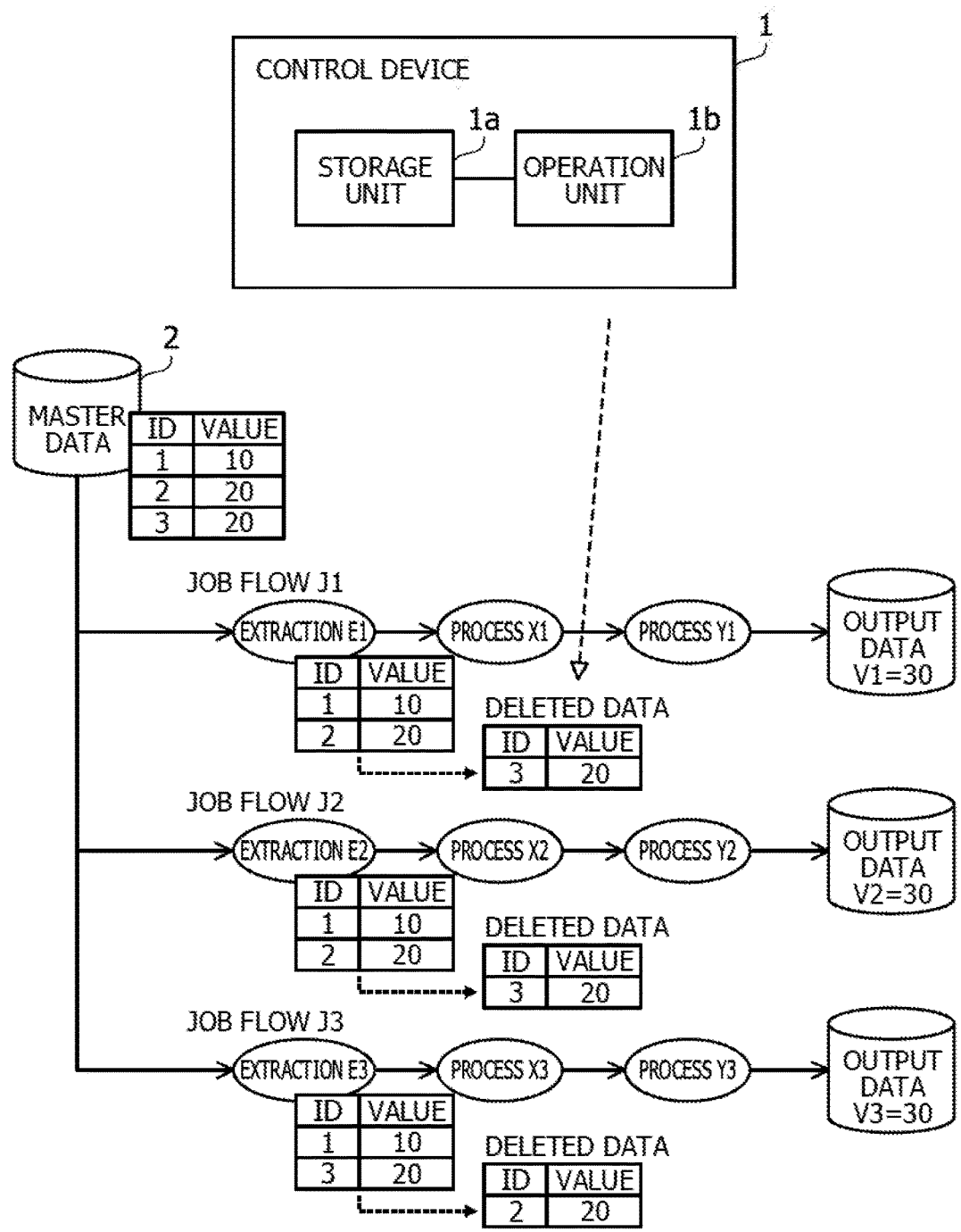
FIG. 1 is a diagram illustrating a control device of a first embodiment.

FIG. 1 is a diagram illustrating a control device of a first embodiment. A control device 1 controls an execution of a job flow. The job flow includes processing content of a plurality of jobs or information about an execution sequence of each job. The job flow may be executed by the control device 1 and may be executed by another device (which is not illustrated in FIG. 1) connected with the control device 1 through a network.

The control device 1 includes a storage unit 1a and an operation unit 1b. The storage unit 1a may be a volatile storage device such as a random access memory (RAM) or may also be a non-volatile storage device such as a hard disk drive (HDD) and a flash memory. The operation unit 1b may include a central processing unit (CPU), a digital signal processor (DSP), an application specific integrated circuit (ASIC), a field programmable gate array (FPGA) or the like. The operation unit 1b may also be a processor executing a program. The "processor" may also include a set (multiprocessor) of a plurality of processors. The control device 1 may also be referred to as a "computer".

The storage unit 1a holds data deleted by a data extraction process or information specifying the deleted data in each of plurality of job flows between which pieces of output data obtained by executing a process of the job flow are coincident among a plurality of job flows executing a process based on the same master data. The operation unit 1b acquires the deleted data or information specifying the deleted data and stores the deleted data and the information in the storage unit 1a.

For example, job flows J1, J2, and J3 execute a process based on the same master data 2. As an example, the master data 2 is a piece of relational data which includes items for an identifier (ID) and a value. A piece of data identification information is registered in the ID item. A setting value included in data is registered in the value item. For example, the master data 2 includes following data. First data is (ID, value)=(1, 10). Second data is (ID, value)=(2, 20). Third data is (ID, value)=(3, 20).

The job flow J1 executes a data extraction process E1 (abbreviated to an "extraction E1" in FIG. 1 and similarly abbreviated in other job flows), and processes X1, and Y1 in this order. The job flow J2 executes a data extraction process E2, processes X2 and Y2 in this order. The job flow J3 executes a data extraction process E3, processes X3 and Y3 in this order. The data extraction processes E1, E2, and E3 extract a piece of data from the master data 2.

Processes X1, X2, and X3 are executed after the data extraction processes E1, E2, and E3, respectively, and for example, process the extracted data in order to perform a subsequent process. The processes Y1, Y2, and Y3 are executed after the processes X1, X2, and X3, respectively, and for example, aggregate the processed data.

The operation unit 1b specifies two or more job flows between which the pieces of output data are coincident among the plurality of job flows executing the process based on the same master data. In a case of the example described above, any of job flows J1, J2, and J3 executes the process based on the same master data 2. The output data V1 of the job flow J1 is V1=30. The output data V2 of the job flow J2 is V2=30. The output data V3 of the job flow J3 is V3=30. That is, V1=V2=V3, and the output data of the job flows J1, J2, and J3 are coincident with each other. In this case, the job flows J1, J2, and J3 have a high possibility of being corresponded to the job flow which performs the common process. For that reason, the operation unit 1b specifies the job flows J1, J2, and J3 as the two or more job flows between which the pieces of output data are coincident among the plurality of job flows executing the process based on the same master data.

The operation unit 1b acquires data deleted by each of the data extraction process E1 of the job flow J1, the data extraction process E2 of the job flow J2, and the data extraction process E3 of the job flow J3 or information specifying the deleted data. The "deleted data" by the data extraction process is also referred to as "non-extracted data".

Specifically, a piece of data extracted from the master data 2 by the data extraction process E1 is (ID, value)=(1, 10), (2, 20). The operation unit 1b acquires (ID, value)=(3, 20) as the data (deleted data) deleted by the data extraction process E1 from the comparison with the master data 2. The operation unit 1b may acquire ID "3" as the information specifying the data deleted by the data extraction process E1.

Data extracted from the master data 2 by the data extraction process E2 is (ID, value)=(1, 10), (2, 20). The operation unit 1b acquires (ID, value)=(3, 20) as the data deleted by the data extraction process E2 from the comparison with the master data 2. The operation unit 1b may acquire ID "3" as the information specifying the data deleted by the data extraction process E2.

Data extracted from the master data 2 by the data extraction process E3 is (ID, value)=(1, 10), (3, 20). The operation unit 1b acquires (ID, value)=(2, 20) as the data deleted by the data extraction process E3 from the comparison with the master data 2. The operation unit 1b may acquire ID "2" as the information specifying the data deleted by the data extraction process E3.

The operation unit 1b controls whether the plurality of job flows between which the pieces of output data are coincident is to be aggregated or not based on the deleted data or information specifying the deleted data. For example, the operation unit 1b aggregates the job flows between which deleted data or information specifying the deleted data are coincident with each other. This is because it is considered that a piece of common data is input for the subsequent process in a case where a piece of the same data is deleted in the data extraction process and it is considered that obtaining the same output by the common input is caused by a fact that the processing contents of the job flows are common. The operation unit 1b does not aggregate a job flow, of which the deleted data or information specifying the deleted data is not coincident with any of the job flows, with another job flow. This is because it is considered that a piece of different data is input for the subsequent process in a case where a piece of different data is deleted in the data extraction process and it is not regarded that the processing contents of both job flows are common even when the same output is obtained by a different input in two job flows.

More specifically, in the example described above, the data extraction processes E1 and E2 are coincident in that the deleted data is (ID, value)=(3, 20). Otherwise, the data extraction processes E1 and E2 are coincident in that a piece of information specifying the deleted data is ID "3". The operation unit 1b aggregates the job flows J1 and J2. That is, the job flows J1 and J2 individually defined are defined as a single job flow. For example, the operation unit 1b may discard a definition for the job flow J2 and also change an execution schedule such that the existing business using the job flow J2 is performed by using the job flow J1.

On the other hand, in the data extraction process E3, the data deleted in the data extraction process E3 is (ID, value)=(2, 20) and is different from the data (ID, value)=(3, 20) deleted in the data extraction processes E1 and E2. Otherwise, the information specifying the deleted data is ID "2" in the data extraction process E3 and is different from the ID "3" which is the information specifying the deleted data in the data extraction processes E1 and E2. The operation unit 1b does not aggregate the job flow J3 with the job flows J1 and J2.

As described above, the control device 1 is able to specify an aggregatable job flows to be aggregated. It is also considered that when the job flows performing the common process are specified, the job flows between which both input data and output data are coincident may be specified as the job flows performing the common process. However, only a coincidence between the input data and the output data is insufficient for a determination of sameness for the job flows. This is because the job flows of which the input data and output data are the same but the processing content is different, for example, a filtering condition is different for the input data, like the job flow J1 and the job flow J3 (otherwise, job flow J2 and job flow J3) are also erroneously determined as the job flows performing the common process.

The control device 1 specifies an aggregation target job flow according to a determination whether data deleted by a data extraction process or information specifying the deleted data are coincident with the input master data 2 among a plurality of job flows between which the input and output data are the same.

In the determination, when the deleted data are coincident, a corresponding job flow group is regarded as an aggregation target. This is because it is considered that common data are input for the subsequent process in a case where data deleted in the data extraction processes performed prior to another job are the same and it is considered that obtaining the same output due to input of the common data is caused by a fact that the processing contents of the job flows are common.

In the determination, when the deleted data are not coincident, the corresponding job flow group is not regarded as an aggregation target. This is because it is considered that the filtering conditions becomes different in the data extraction processes in a case where data deleted in the data extraction processes performed prior to another job are different in two job flows. In this case, in two job flows, even though different data are input for a subsequent process and the same output is obtained for the different input in each job flow, it is not true that the processing contents of respective job flows are typically common. The sameness of the data deleted by the data extraction process is also confirmed in addition to the sameness of the input and output data to thereby make it possible to increase an accuracy in a sameness determination of the job flows.

In particular, deleted data or information specifying the deleted data is used in the sameness determination of the job flows to thereby make it possible to execute the determination at high speed. For example, the deleted data may be irregular data such as error data included in the master data 2 or data which becomes non-processing target due to, for example, a business instruction on the day. In this case, the deleted data is often small compared with the entire size of the extracted data. Accordingly, the deleted data may be used as a comparison target so as to make it possible to suppress a size of data regarded as the comparison target to be smaller, and the sameness determination of the job flows is able to be performed at high speed. An amount of hardware resources used in the determination process may be reduced than the comparison between the extracted data. The plurality of job flows managed in a redundant configuration are aggregated to be unified so as to make it possible to reduce maintenance costs of the job flows.

Second Embodiment

Figure 2:
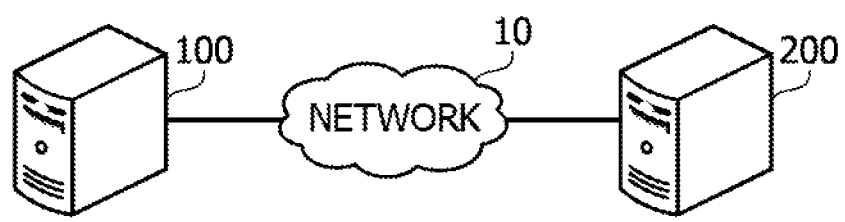
FIG. 2 is a diagram illustrating an example of an information processing system of a second embodiment.

FIG. 2 is a diagram illustrating an example of an information processing system of a second embodiment. The information processing system of the second embodiment includes an analysis server 100 and an operation server 200. The analysis server 100 and the operation server 200 are connected to a network 10. The network 10 is, for example, a local area network (LAN). The network 10 may be a wide area network (WAN) or the Internet.

The analysis server 100 is a server computer providing a test environment of the operation server 200. Specifically, the analysis server 100 executes the same software as a business server executed by the operation server 200 and performs confirmation of an operation.

In the second embodiment, job management software which controls the execution of a plurality of job flows is used as business software which becomes a test target is considered. The job management software may be used in various kinds of businesses such as sales management in store, banking operations at a bank, distribution and sales management in distribution business, or production control in manufacturing business industry. A batch process executed in these businesses may be automatized as a job flow by the job management software.

The analysis server 100 provides a function of specifying a plurality of job flows executing the same process and aggregating the plurality of specified job flows in the operation server 200. The analysis server 100 is an example of a control device 1 of the first embodiment.

The operation server 200 is a server computer used in an actual business. The operation server 200 is able to provide a piece of information used for the process of aggregating a plurality of job flows to the analysis server 100.

Figure 3:
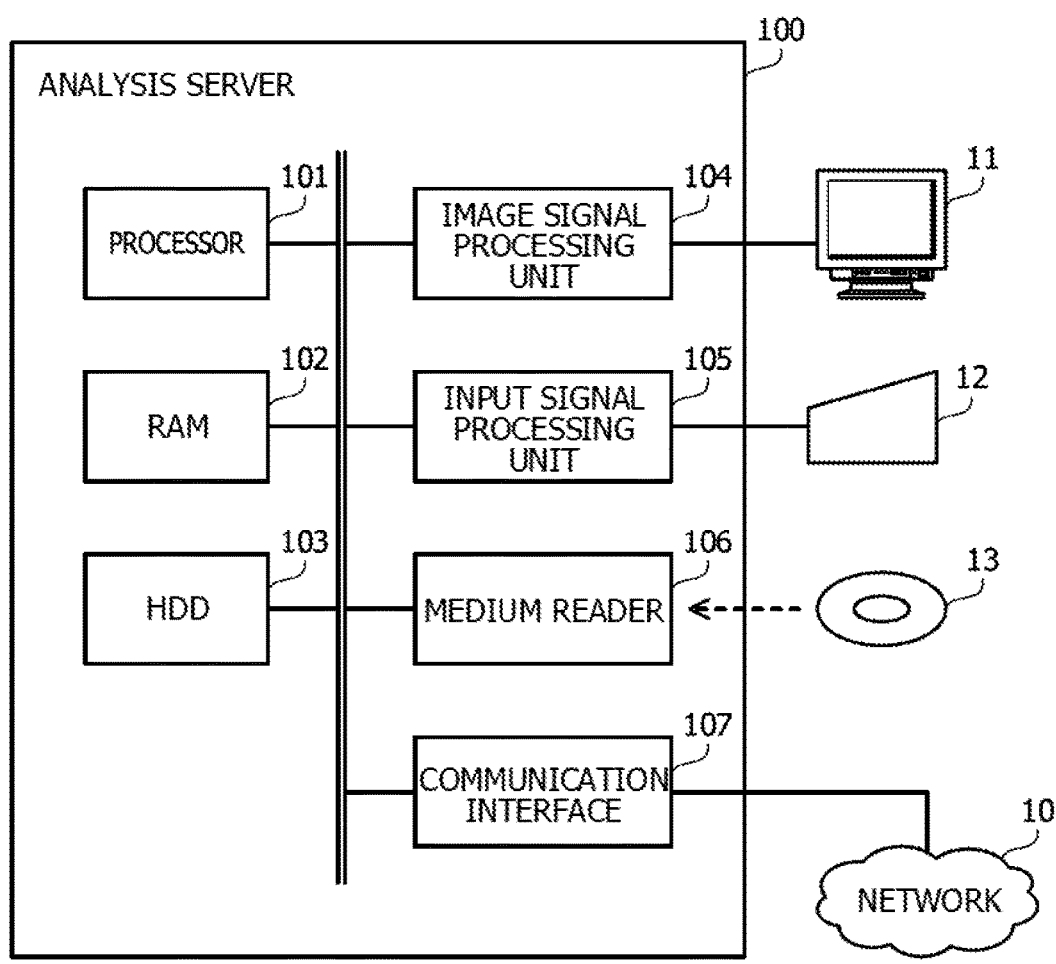
FIG. 3 is a diagram illustrating an example of hardware of an analysis server.

FIG. 3 is a diagram illustrating an example of hardware of an analysis server. The analysis server 100 includes a processor 101, a RAM 102, a HDD 103, an image signal processing unit 104, an input signal processing unit 105, a medium reader 106, and a communication interface 107. Respective units are connected to a bus of the analysis server 100. The operation server 200 may also be implemented by the same units as those of the analysis server 100.

The processor 101 controls information processing of the analysis server 100. The processor 101 may be a multiprocessor. The processor 101 may also be, for example, a CPU, a DSP, an ASIC or an FPGA. The processor 101 may also be a combination of two or more of the CPU, the DSP, the ASIC, the FPGA, and the like.

The RAM 102 is a main storage device of the analysis server 100. In the RAM 102, at least a portion of an operating system (OS) program for execution by the processor 101 or an application program is temporarily stored. In the RAM 102, various pieces of data desired for processing by the processor 101 are stored.

The HDD 103 is an auxiliary storage device of the analysis server 100. The HDD 103 magnetically writes data into and reads out data from a disk having built therein. In the HDD 103, the OS program, the application program, and various data are stored. The analysis server 100 may be provided with another type of auxiliary storage device such as a flash memory or a solid state drive (SSD), and may also be provided with a plurality of auxiliary storage devices.

The image signal processing unit 104 outputs an image on a display 11 connected to the analysis server 100 according to the instruction from the processor 101. The display 11 may use a cathode ray tube (CRT) display or a liquid crystal display device, or the like.

The input signal processing unit 105 acquires an input signal from an input device 12 connected to the analysis server 100 and outputs the signal to the processor 101. For example, other pointing devices such as a mouse and a touch panel, a keyboard, or the like may be used as the input device 12.

The medium reader 106 is a device to read a program or data stored in a recording medium 13. The recording medium 13 may include, for example, a magnetic disk such as a flexible disk (FD) or the HDD, an optical disk such as a compact disc (CD), or a digital versatile disc (DVD), and a magneto-optical disk (MO). As the recording medium 13, for example, a non-volatile semiconductor memory such as a flash memory card may be used. The medium reader 106, for example, stores the program or data read from the recording medium 13 in the RAM 102 or the HDD 103 according to the instruction from the processor 101.

The communication interface 107 communicates with other apparatuses through the network 10. The communication interface 107 may be a wired communication interface and also a wireless communication interface.

Figure 4:
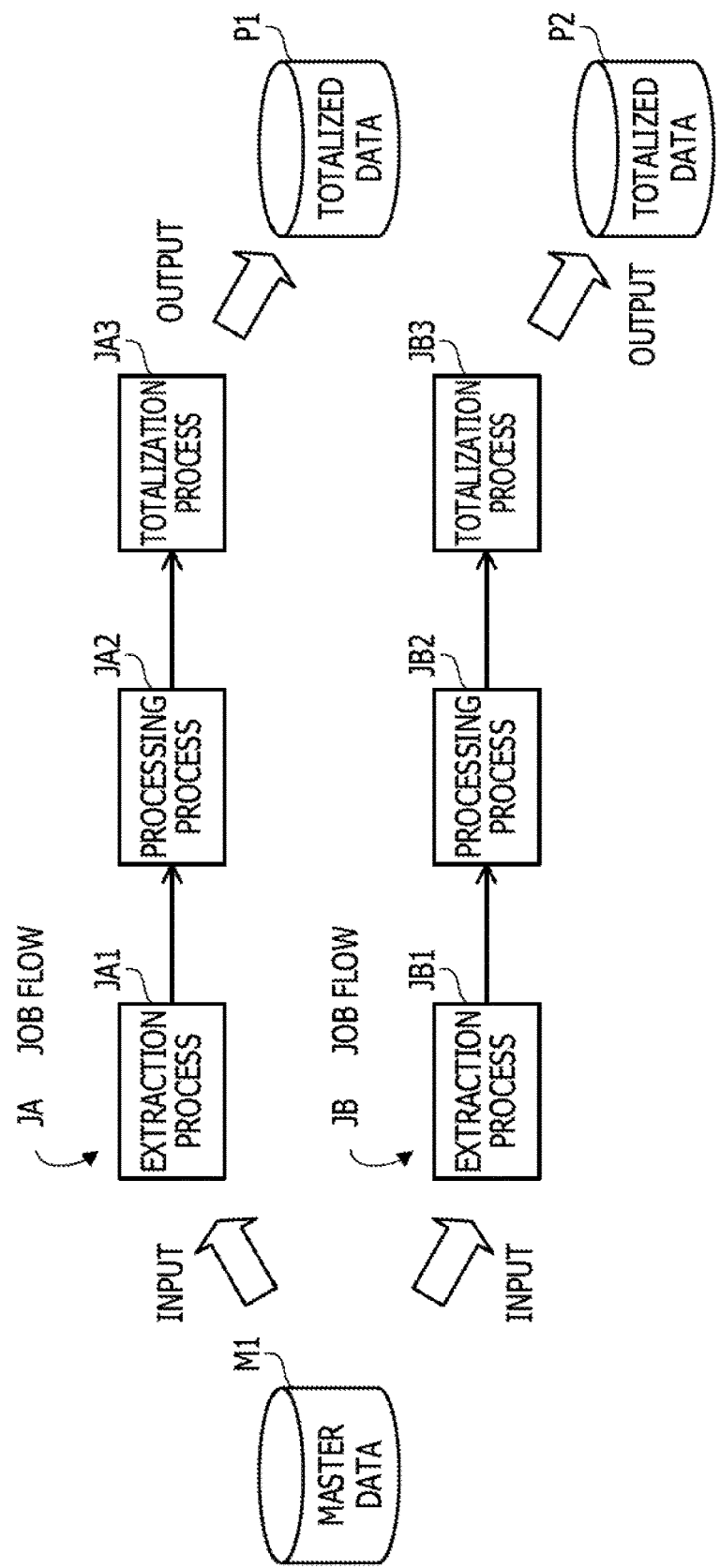
FIG. 4 is a diagram illustrating an example of job flow.

FIG. 4 is a diagram illustrating an example of job flow. As described above, the job management software may be used in various kinds of businesses (retail sales, bank, distribution and manufacturing, or the like). On the other hand, the batch process itself used in respective businesses is often implemented mainly by the following three kinds of processes. Specifically, the three kinds of processes are a "data extraction process", a "data processing process", and a "data totalization process" (executed in this order and an execution sequence is not reversed).

The "data extraction process" is a process for extracting a piece of data from input data under a predetermined condition. The "data processing process" is a process for processing data in a predetermined format in order to perform the "data totalization process" located in a next stage. The "data totalization process" is a process for totalizing the processed data and outputs the totalized data.

In the following description, the "data extraction process" may be abbreviated to an "extraction process". The "data processing process" may be abbreviated to a "processing process". The "data totalization process" may be abbreviated to a "totalization process".

For example, job flows JA and JB are defined in the job management system. The input data of the job flows JA and JB are the master data M1. The output data of the job flow JA is the totalized data P1. The output data of the job flow JB is the totalized data P2.

The job flow JA includes jobs JA1, JA2, and JA3. The jobs JA1, JA2, and JA3 are executed in this order. The job JA1 is a data extraction process of extracting data from the master data M1. The job JA2 is a data processing process for a result of the job JA1. The job JA3 is a data totalization process for a result of the job JA2.

The job flow JB includes jobs JB1, JB2, and JB3. The jobs JB1, JB2, and JB3 are executed in this order. The job JB1 is a data extraction process of extracting data from the master data M1. The job JB2 is a data processing process for a result of the job JB1. The job JB3 is a data totalization process for a result of the job JB2.

As described above, in the job management software, a fixed type process is executed by a plurality of job flows. In this case, the same process may be executed in a plurality of job flows. When a plurality of job flows executing the same process is defined and used in a business, maintenance costs of the job flows may be increased. The analysis server 100 provides a function of specifying a job flow group which executes the same process and aggregating the specified job flow group.

The analysis server 100 collects pieces of information in two stages of (1) a test operation and (2) an actual operation in order to aggregate the job flows. The functions, which are exhibited in respective stages of the test operation and the actual operation by the analysis server 100, are different. In the stage of the test operation, the analysis server 100 tentatively executes of software of a test target so as to determine a plurality of job flows (may be referred to as a candidate flow), which are regarded as a monitoring target in the actual operation. In the stage of the actual operation, the analysis server 100 monitors the result of the data extraction process of a plurality of candidate flows executed by the operation server 200 and determines a job flow group regarded as an aggregation target. Next, description will be made on the function exhibited by the analysis server 100 in each stage. First, description will be made on the function of the analysis server 100 in the test operation stage.

Figure 5:
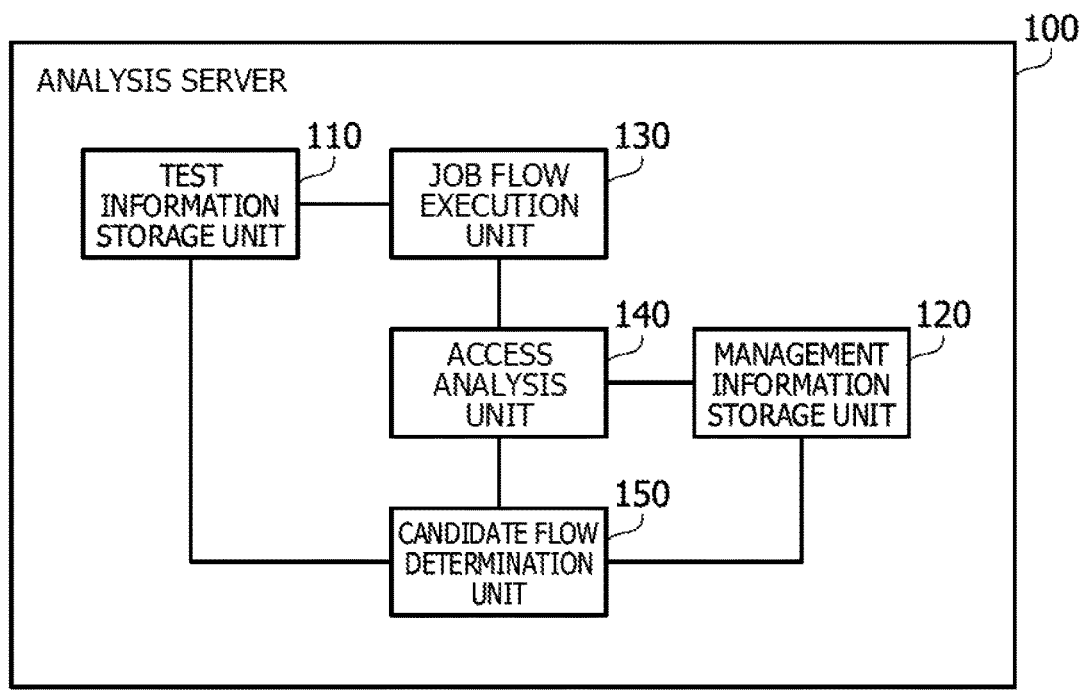
FIG. 5 is a diagram illustrating an example of functions of the analysis server in a test operation.

FIG. 5 is a diagram illustrating an example of functions of the analysis server in a test operation. The analysis server 100 includes a test information storage unit 110, a management information storage unit 120, a job flow execution unit 130, an access analysis unit 140, and a candidate flow determination unit 150.

The test information storage unit 110 and the management information storage unit 120 may be implemented as a storage area secured in the RAM 102 or the HDD 103. The job flow execution unit 130, the access analysis unit 140, and the candidate flow determination unit 150 may be implemented by causing the processor 101 to execute a program stored in the RAM 102.

The test information storage unit 110 stores a sample of the master data inputted in each job flow. The sample of the master data may also be a copy of actual master data at a given time. The test information storage unit 110 stores information of a plurality of job flows executed in the actual operation. The information of the job flow may also be referred to as definition information of a job flow. The definition information of the job flow includes identification information of a job flow, identification information of a job included in the job flow, the processing content of the job, an execution sequence of the job, an execution time of the job flow, and the like. The processing content of the job is processing content of each of a plurality of jobs (extraction process, processing process, and totalization process) included in a job flow. The information of the job flow includes information such as a storing source of the input data which is input to the job flow, a storing destination of the output data which is output from the job flow, or the like.

The management information storage unit 120 stores input data and output data for each job flow. The input data and the output data for each job flow are prepared by the access analysis unit 140. The input data and the output data for each job flow are used for a determination of a candidate flow performed by the candidate flow determination unit 150. The management information storage unit 120 stores information indicating a plurality of candidate flows, which are regarded as the monitoring target in the actual operation stage.

The job flow execution unit 130 executes each of a plurality of job flows executed in the actual operation based on a piece of information of a plurality of job flows and the sample of the master data stored in the test information storage unit 110.

The access analysis unit 140 acquires the input data and the output data of the plurality of job flows executed by the job flow execution unit 130 and outputs the input data and the output data to the management information storage unit 120.

The candidate flow determination unit 150 determines a candidate flow based on the input data and the output data of each job flow output by the access analysis unit 140. Specifically, the candidate flow determination unit 150 records the job flow groups between which the contents of the input data and the output data are coincident in the management information storage unit 120 as a candidate of an aggregation target. For example, the candidate flow determination unit 150 may determine whether pieces of the input data of two job flows are coincident or not depending on whether pieces of identification information (for example, may also be a path indicating a table name of the input data or a storing location of the input data) of the input data are coincident or not. The candidate flow determination unit 150 may determine whether the pieces of output data of two job flows are coincident or not by determining whether the pieces of output data of two job flows are coincident or not by collating the pieces of output data of the two job flows.

Next, description will be made on the function of the analysis server 100 in the actual operation stage. In the actual operation stage, the analysis server 100 acquires a piece of information from the operation server 200 and thus, a function of the operation server 200 will be also described.

Figure 6:
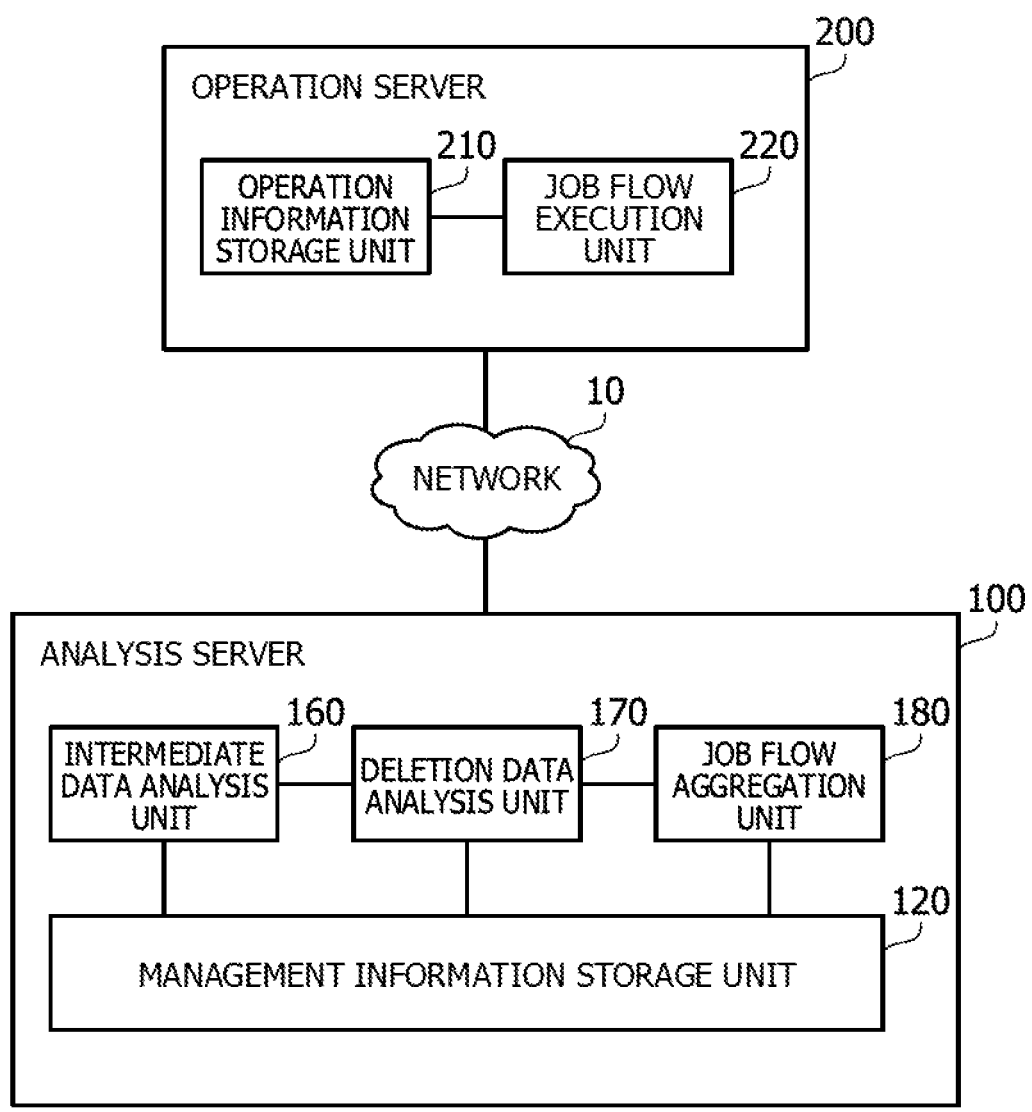
FIG. 6 is a diagram illustrating an example of functions of the analysis server in an actual operation.

FIG. 6 is a diagram illustrating an example of functions of the analysis server in an actual operation. The operation server 200 includes an operation information storage unit 210 and a job flow execution unit 220. The operation information storage unit 210 is implemented as a storage area secured in the RAM or the HDD provided in the operation server 200. The job flow execution unit 220 may be implemented by causing a processor provided in the operation server 200 to execute a program stored in the RAM provided in the operation server 200.

The operation information storage unit 210 stores the master data input in each job flow in the actual environment. The operation information storage unit 210 stores a piece of information of each job flow executed in the actual environment. The piece of information stored in the test information storage unit 110 described above may be considered as a copy of the piece of information stored in the operation information storage unit 210.

The job flow execution unit 220 executes an actual business processing based on the master data stored in the operation information storage unit 210 and definition information of a job flow. The job flow execution unit 220 provides a processing result of a job in each job flow to the analysis server 100. A piece of data other than final output data of the job flow among the processing results of each job is regarded to be referred to as an "intermediate data". A result of the data extraction process of the pieces of the intermediate data is regarded to be referred to as an "extracted data".

The analysis server 100 includes a management information storage unit 120, an intermediate data analysis unit 160, a deletion data analysis unit 170, and a job flow aggregation unit 180. The management information storage unit 120 is similar to the function of the same name described with reference to FIG. 5. The intermediate data analysis unit 160, the deletion data analysis unit 170, and the job flow aggregation unit 180 are implemented by causing the processor 101 to execute a program stored in the RAM 102.

The management information storage unit 120 stores a piece of information about the intermediate data and a piece of information for managing sameness of the processes of a plurality of candidate flows, in addition to the piece of information illustrated in FIG. 5.

The intermediate data analysis unit 160 acquires the processing result of each job included in the candidate flow from the operation server 200 to acquire the intermediate data. The intermediate data analysis unit 160 acquires a piece of extracted data extracted by the data extraction process of the job flow from the intermediate data and stores the piece of extracted data in the management information storage unit 120.

The intermediate data analysis unit 160 acquires a piece of deleted data based on the piece of acquired extracted data and the master data input in the job flow of an acquisition source of the extracted data. The deleted data is a piece of difference data between the master data and the extracted data. The deleted data may be regarded as a piece of data not extracted by the data extraction process. The deletion data analysis unit 170 may inquire of the operation server 200 about the master data input in the corresponding job flow in order to obtain the deleted data. Otherwise, when the sample of the master data of the test information storage unit 110 has the same content as that of the master data of the operation information storage unit 210, the deletion data analysis unit 170 may acquire a sample of the corresponding master data from the test information storage unit 110 and also use the sample in the acquisition of the deleted data.

The deletion data analysis unit 170 specifies the job flow group in which the pieces of deleted data are coincident, among a plurality of job flows in which the input master data and the output totalized data are coincident, as a job flow group of an aggregation target.

The job flow aggregation unit 180 aggregates the job flow groups of the aggregation target specified by the deletion data analysis unit 170. Specifically, the job flow aggregation unit 180 discards other pieces of the definition information while leaving a single piece of definition information among a plurality of pieces of definition information of the job flow group stored in the operation information storage unit 210. The job flow aggregation unit 180 may change an execution schedule of the job flow such that the business processing executed by the job flow group is executed by a single job flow and reflect a changed result into definition information of the job flow stored in the operation information storage unit 210. The job flow aggregation unit 180 changes the definition information of the job flow stored in the operation information storage unit 210 and also changes the definition information of the job flow stored in the test information storage unit 110 to become the same content.

Next, description will be made on a piece of information used in the process of a second embodiment. In the following, the piece of information mainly on the assumption that the job management software is used in the business of retail sales is illustrated (may also be information relating to other businesses).

FIG. 7 is a diagram illustrating an example of master data. Master data M1 is stored in the operation information storage unit 210. A sample (may also be a copy) of the master data M1 is stored in the test information storage unit 110. In the master data M1, various kinds of information are managed in a relational database (RDB) format. The master data M1 includes items for a store name, a goods name, and a sales amount.

A store name of a retailer is registered in an item of the store name. The goods name sold in the store is registered in the item of the goods name. A sales amount of the goods is registered in the item of the sales amount. For example, pieces of information such as "N1" of the store name, "R1" of the goods name, and "ten million" of the sales amount are registered in the master data M1. The piece of information indicates that the sales amount of the goods of the goods name "R1" is ten million yen in the store of the store name "N1".

One set (corresponding to a single row of master data M1) of setting values of the store name, the goods name, and the sales amount included in the master data M1 may be referred to as a single record.

FIG. 8 is a diagram illustrating an example of an aggregation candidate management table. The aggregation candidate management table 121 is stored in the management information storage unit 120. The aggregation candidate management table 121 includes items for the job flow name and the group name.

A name of the job flow is registered in the item of the job flow name. The job flow name may be identification information of the job flow. A name of a group to which the job flow belongs is registered in the item of the group name. The group name may be identification information of the group. For example, the pieces of information such as a "job flow JA" of the job flow name and a "group G1" of the group name are registered in the aggregation candidate management table 121. The piece of information indicates that the job flow JA belongs to a group G1.

FIG. 9 is a diagram illustrating an example of the number-of-deleted-records table. The number-of-deleted-records table 122 is stored in the management information storage unit 120. The number-of-deleted-records table 122 includes items for the job flow name and the number of deleted records.

A name of the job flow is registered in the item of the job flow name. The number of deleted records (corresponding to a single record of the master data M1) is registered in the item of the number of deleted records. For example, the pieces of information such as a "job flow JA" of the job flow name and a "70" of the number of deleted records are registered in the number-of-deleted-records table 122. The pieces of information indicate that the number of deleted records is 70 in the job flow JA.

FIG. 10 is a diagram illustrating an example of deleted-data management information. The deleted-data management information 123 includes deleted data table of each of a plurality of candidate flows. A single deleted data table may be considered as a unit of deleted data. For example, the deleted-data management information 123 includes deleted data tables 123a, 123b, 123c, and 123d of the job flows JA, JB, JC, and JD that belong to the same group (group G1). In the following, although description will be made mainly on a data structure of the deleted data table 123a, data structures of other deleted data tables are also similar to the data structure.

The deleted data table 123a may include the same items as those of the master data M1. The items included in the deleted data table 123a may correspond to some of the item included in the master data M1. For example, the deleted data table 123a includes items for the store name, the goods name, and the sales amount. As will be described later, even when the job flows belong to the same group, the data items included in each deleted data table may be coincident between the job flows, but not fully.

An example in which the analysis server 100 holds the deleted data itself as the deleted-data management information 123 has been described. On the other hand, the analysis server 100 may hold a piece of information specifying the deleted data (for example, each record within the deleted data table) as the deleted-data management information 123, instead of the deleted data itself. As the piece of information specifying the deleted data, for example, the identification information of each record included in the master data M1 may be considered. More specifically, a key (main key) (an item corresponding to a main key (for example, a record number) is omitted in the example of the master data M1 of FIG. 7) uniquely specifying the record may be considered as the identification information of each record. In this case, when a determination whether the pieces of deleted data of each job flow are the same or not is performed, the analysis server 100 may compare the pieces of identification information of the record so as to determine whether the pieces of deleted data of each job flow are the same or not.

FIG. 11 is a diagram illustrating an example of a process-same-determination management table. The process-same-determination management table 124 is stored in the management information storage unit 120. The result of the sameness determination by the deletion data analysis unit 170 in the process of the job flow is registered in the process-same-determination management table 124 for each group of job flows in association with the determination time. In the process-same-determination management table 124, pieces of information of a group G1 (to which job flows JA, JB, JC, and JD belong) are illustrated. Specifically, in each point of time, a flag of "TRUE" is set to a job flow for which the deleted data table is the same as any of the job flows belonging to the same group. A flag of "FALSE" is registered in the job flow for which the deleted data table is not coincident with the other job flows belonging to the same group. Other groups are also managed by a similar table.

In the following description, it is regarded that the analysis process for the deleted data by the deletion data analysis unit 170 is performed on a daily basis. The job flows JA, JB, JC, and JD, which belong to the group G1, are executed once a day, respectively (at a scheduled point of time such as twelve o'clock, eighteen o'clock, or the like). The deletion data analysis unit 170 performs the sameness determination of the job flows JA, JB, JC, and JD for each time by using collected results of the deleted data each of the job flows JA, JB, JC, and JD for a day (deleted data used in the determination of sameness may be discarded).

According to the process-same-determination management table 124, the pieces of information such as the "TRUE" of the job flow JA, the "TRUE" of the job flow JB, the "TRUE" of the job flow JC, and the "TRUE" of the job flow JD are registered at the point in time of "2015/08/16 07:00". This indicates that all pieces of deleted data are the same in the data extraction process of the job flows JA, JB, JC, and JD, which belong to the group G1, in the determination at the point in time of 2015/8/16 07:00.

According to the process-same-determination management table 124, the pieces of information such as the "TRUE" of the job flow JA, the "FALSE" of the job flow JB, the "TRUE" of the job flow JC, and the "FALSE" of the job flow JD are registered at the point in time of "2015/08/25 07:00". This indicates that the deleted data tables corresponding to the data extraction processes of the job flows JA and JC are the same in the determination at the point in time of 2015/8/25 07:00. This also indicates that in the determination performed at the same point in time, the deleted data table corresponding to the data extraction processes of the job flows JB is not coincident with any of the deleted data tables of the job flows JA, JC, and JD. Furthermore, this also indicates that in the determination performed at the same point in time, the deleted data table corresponding to the data extraction processes of the job flows JD is not coincident with any of the deleted data tables of the job flows JA, JB, and JC.

According to the process-same-determination management table 124, the pieces of information such as the "TRUE" of the job flow JA, the "FALSE" of the job flow JB, the "TRUE" of the job flow JC, and the "TRUE" of the job flow JD are registered at the point in time of "2015/08/27 07:00". This indicates that the deleted data tables corresponding to the data extraction processes of the job flows JA, JC, and JD are the same in the determination at the point in time of 2015/8/27 07:00. This also indicates that in the determination performed at the same point in time, the deleted data table corresponding to the data extraction processes of the job flows JB is not coincident with any of the deleted data tables of the job flows JA, JC, and JD.

According to the process-same-determination management table 124, the pieces of information such as the "TRUE" of the job flow JA, the "TRUE" of the job flow JB, the "TRUE" of the job flow JC, and the "FALSE" of the job flow JD are registered at the point in time of "2015/08/28 07:00". This indicates that the deleted data tables corresponding to the data extraction processes of the job flows JA, JB, and JC are the same in the determination at the point in time of 2015/8/28 07:00. Furthermore, this also indicates that in the determination performed at the same point in time, the deleted data table corresponding to the data extraction processes of the job flows JD is not coincident with any of the deleted data tables of the job flows JA, JB, and JC.

Next, a procedural sequence by the analysis server 100 will be described.

Figure 12:
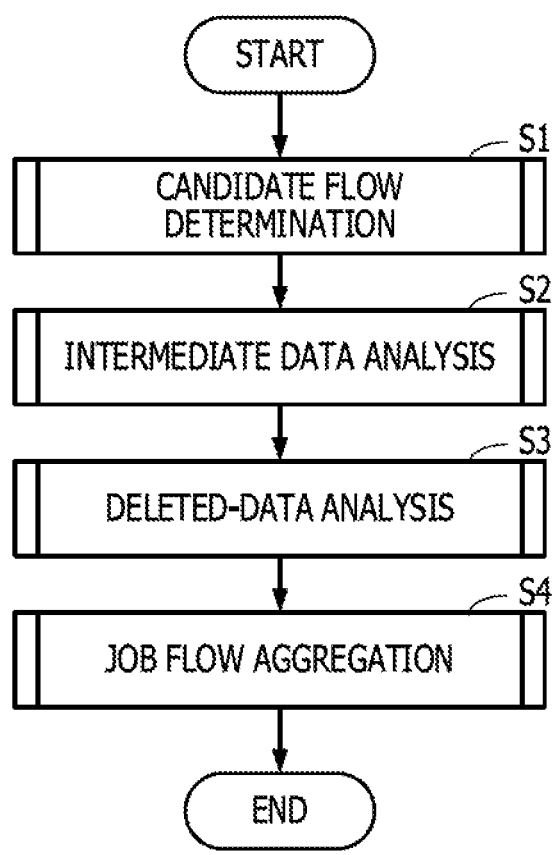
FIG. 12 is a flowchart illustrating an example of a process performed by an analysis server.

FIG. 12 is a flowchart illustrating an example of a process performed by an analysis server. In the following, the process illustrated in FIG. 12 will be described in line with step numbers.

(S1) The candidate flow determination unit 150 executes a candidate flow determination process. Specifically, the candidate flow determination unit 150 determines a candidate flow regarded as the aggregation target based on the execution result of the job flow in the test operation. The candidate flow determination unit 150 groups the candidate flows. Details of the process will be described later. Step S1 corresponds to a process in the test operation.

(S2) The intermediate data analysis unit 160 executes an intermediate data analysis process. Specifically, the intermediate data analysis unit 160 acquires a piece of intermediate data generated by each job of the job flow (candidate flow) executed in the actual operation from the operation server 200 to acquire extracted data generated by the data extraction process. The intermediate data analysis unit 160 acquires the deleted data or the number of deleted records based on the acquired extracted data and the master data input into the job flow which generates the extracted data. Details of the process will be described later.

(S3) The deletion data analysis unit 170 executes a deleted-data analysis process. Specifically, the deletion data analysis unit 170 compares the deleted data acquired by the intermediate data analysis unit 160 and the number of deleted records between the candidate flows belonging to the same group. The deletion data analysis unit 170 determines a combination of the job flows to be regarded as the aggregation target according to the comparison result. Details of the process will be described later. The deletion data analysis unit 170 executes the deleted-data analysis process of Step S3 at a predetermined scheduled point in time (for example, the process-same-determination management table 124 corresponds to a case that the process is scheduled to be executed at 7 o'clock every day).

(S4) The job flow aggregation unit 180 executes a job flow aggregation process. Specifically, the job flow aggregation unit 180 changes execution contents of business processing of the plurality of job flows, each of which executes the same process, to be executed by a single job flow. Details of the process will be described later. Here, Steps S2, S3, and S4 are processes in the actual operation.

Next, sequences of respective steps of FIG. 12 will be described.

Figure 13:
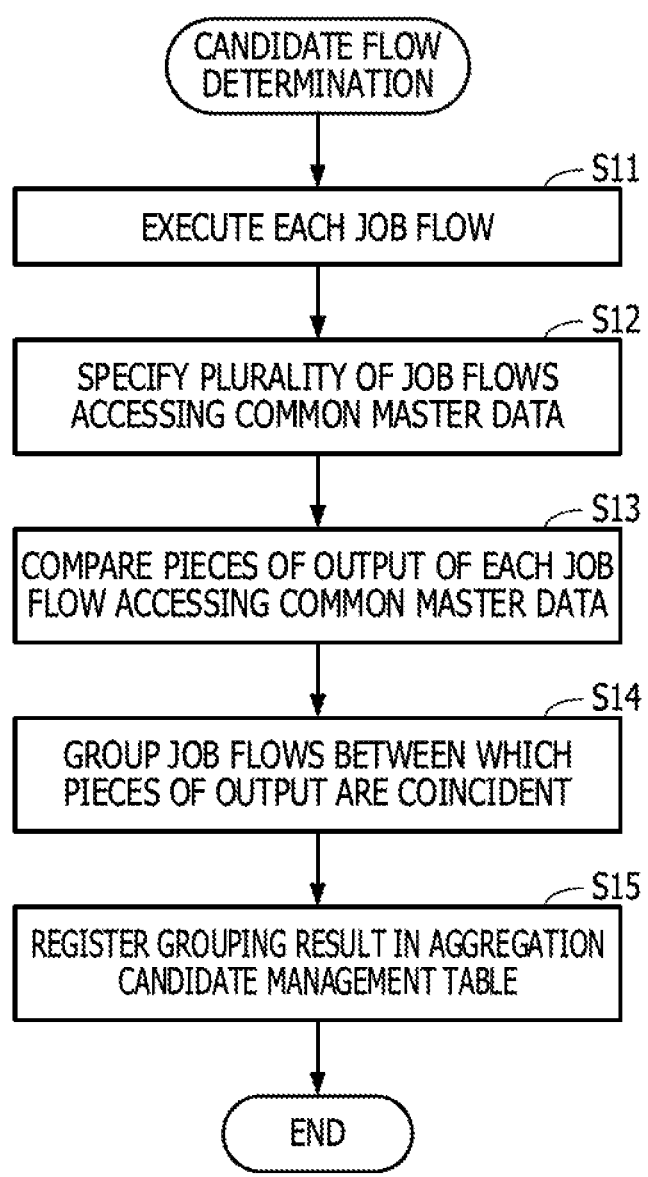
FIG. 13 is a flowchart illustrating an example of a candidate flow determination process.

FIG. 13 is a flowchart illustrating an example of a candidate flow determination process. In the following, the process illustrated in FIG. 13 will be described in line with step numbers. The procedural sequences indicated in the following correspond to Step S1 of FIG. 12.

(S11) The job flow execution unit 130 executes each job flow based on the definition information of the job flow stored in the test information storage unit 110 and the sample of the master data. When the job flow is executed, the access analysis unit 140 stores an access analysis result obtained from correlating the master data which is the input data of the job flow and the output data with the identification information (job flow name) of the job flow, in the management information storage unit 120. Only the identification information of the master data may be the piece of information of the master data to be stored in the management information storage unit 120 by the access analysis unit 140. The information of the output data to be stored in the management information storage unit 120 by the access analysis unit 140 includes the content of the totalized data.

(S12) The candidate flow determination unit 150 specifies a plurality of job flows accessing a piece of common master data based on the access analysis result stored in the management information storage unit 120.

(S13) The candidate flow determination unit 150 compares the pieces of output data (totalized data) of respective job flows accessing the piece of common master data based on the access analysis result stored in the management information storage unit 120.

(S14) The candidate flow determination unit 150 groups the job flows, between which the pieces of output data (totalized data) are coincident, of respective job flows accessing the piece of common master data. The candidate flow determination unit 150 may prepare a plurality of groups. For example, the candidate flow determination unit 150 prepares a group G1 to which the job flows JA, JB, JC, and JD belong.

(S15) The candidate flow determination unit 150 registers grouping results in the aggregation candidate management table 121 stored in the management information storage unit 120. In the aggregation candidate management table 121, group names of one or more of groups and the job flow names of the jobs belonging to the group are registered.

Figure 14:
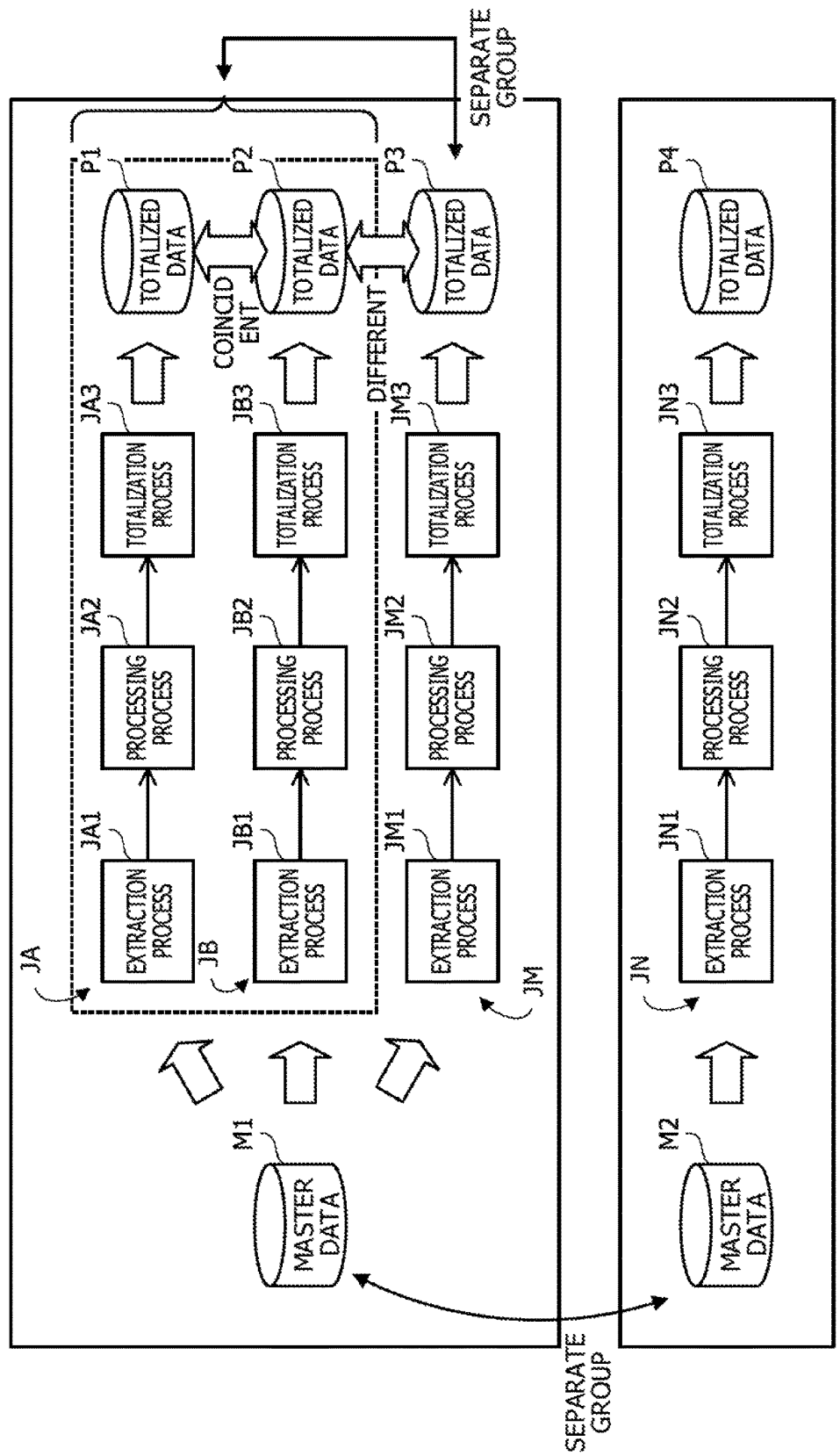
FIG. 14 is a diagram illustrating a specific example of a candidate flow determination process.

FIG. 14 is a diagram illustrating a specific example of a candidate flow determination process. For example, the samples (simply, referred to as master data M1 and M2) of the master data M1 and M2 are stored in the test information storage unit 110.

For example, the master data M1 is an input of the job flows JA, JB, and JM. Here, the job flow JM includes three jobs of a job JM1 (extraction process), a job JM2 (processing process), and a job JM3 (totalization process). The output data of the job flow JM is totalized data P3.

For example, the master data M2 is an input data of a job flow JN. Here, the job flow JN includes three jobs of a job JN1 (extraction process), a job JN2 (processing process), and a job JN3 (totalization process). The output data of the job flow JN is totalized data P4.

In this case, the input data of the job flows JA, JB, and JM are the master data M1 and the input data of the job flow JN is the master data M2. Accordingly, the candidate flow determination unit 150 does not make the job flow JN belong to the group to which the job flows JA, JB, and JM belong.

The content of the totalized data P1 which is the output data of the job flow JA is coincident with the content of the totalized data P2 which is the output data of the job flow JB. The content of the totalized data P3 which is the output data of the job flow JM is different from the contents of the totalized data P1 and P2. Accordingly, the candidate flow determination unit 150 makes the job flows JA and JB belong to the same group (group G1). The candidate flow determination unit 150 does not make the job flow JM belong to the group to which the job flows JA and JB belong.

For example, in a case where there exists another job flow which receives the master data M1 as an input and outputs the output data of which the content is the same as the totalized data P3, the candidate flow determination unit 150 groups the other job flow and the job flow JM (becomes a group different from the group G1).

For example, in a case where there exists another job flow which receives the master data M2 as input and outputs the output data of which the content is the same as the totalized data P4, the candidate flow determination unit 150 groups the other job flow and the job flow JN (becomes a group different from the group G1).

The candidate flow determination unit 150 determines a candidate flow which becomes the aggregation target in the actual operation and arranges the candidate flow in the group. The intermediate data analysis unit 160 receives a piece of intermediate data of the job flow from the operation server 200 each time when any one of job flows are executed by the operation server 200 during the actual operation by the operation server 200 and executes the next process.

Figure 15:
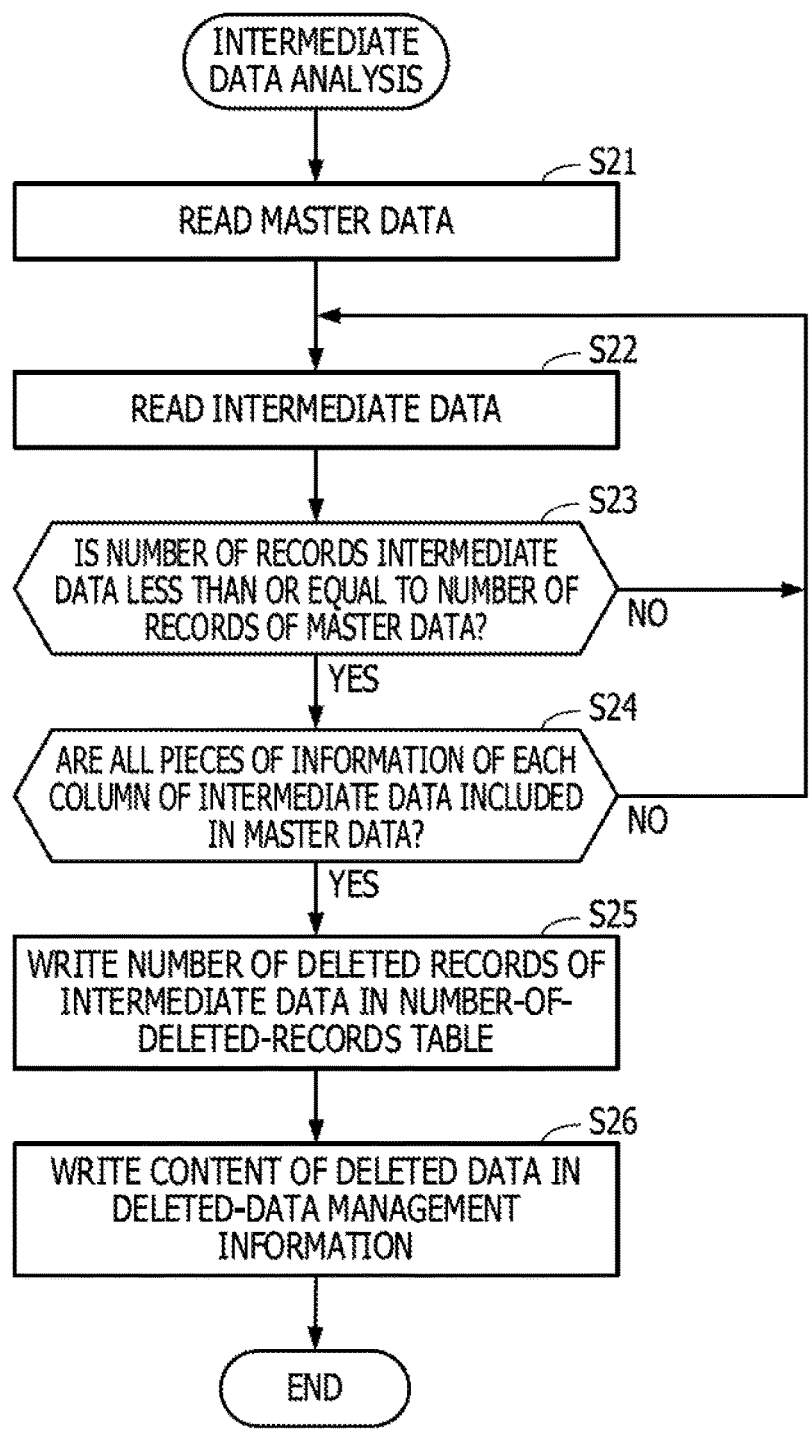
FIG. 15 is a flowchart illustrating an example of an intermediate data analysis process.

FIG. 15 is a flowchart illustrating an example of an intermediate data analysis process. In the following, the process illustrated in FIG. 15 will be described in line with step numbers. The procedural sequences indicated in the following corresponds to Step S2 of FIG. 12. The intermediate data analysis unit 160 executes the following procedural sequences relating to the job flow (candidate flow) stored in the aggregation candidate management table 121. The intermediate data analysis unit 160 may not execute the following procedural sequences relating to the job flow other than the candidate flow.

(S21) The intermediate data analysis unit 160 reads the master data input to the executed job flow. When the sample of the master data stored in the test information storage unit 110 is in synchronization with the master data of the operation server 200, the intermediate data analysis unit 160 may acquire the master data from the test information storage unit 110. Otherwise, the intermediate data analysis unit 160 may acquire the master data from the operation server 200.

(S22) The intermediate data analysis unit 160 reads the intermediate data received from the operation server 200. The intermediate data may exist for each job. The intermediate data analysis unit 160 may specify the extracted data prepared by the job corresponding to the data extraction process from the intermediate data for each job by performing the procedural sequences of Steps S23 and S24.

(S23) The intermediate data analysis unit 160 determines whether the number of records of the intermediate data is less than or equal to the number of records of the master data or not. When the number of records of the intermediate data is less than or equal to that of the master data, the process proceeds to Step S24. When the number of records of the intermediate data is greater than the number of records of the master data, the process proceeds to Step S22 (reading of intermediate data is performed per the same job flow).

(S24) The intermediate data analysis unit 160 determines whether all pieces of information of each column of the intermediate data are included in the master data. In a case where all pieces of information of each column of the intermediate data are included in the master data, the process proceeds to Step S25 (in this case, the intermediate data is a piece of extracted data prepared by the data extraction process). In a case where at least a portion of pieces of information of each column of the intermediate data is not included in the master data, the process proceeds to Step S22 (reading of intermediate data is performed per the same job flow).

(S25) The intermediate data analysis unit 160 compares the intermediate data (extracted data prepared by the data extraction process) and the master data read in Step S21 and acquires a difference between the intermediate data (extracted data) and the master data as a piece of deleted data. The intermediate data analysis unit 160 acquires the number of deleted records based on the piece of deleted data and writes the number of deleted records in the number-of-deleted-records table 122 stored in the management information storage unit 120 correlated with a job flow name of a job flow (job flow executed at this time) of interest.

(S26) The intermediate data analysis unit 160 writes the content of the piece of deleted data acquired in Step S25 in the deleted-data management information 123 stored in the management information storage unit 120 in correlation with the job flow name of the job flow of interest.

The reason the determination of Step S23 is performed is that it may be determined whether the intermediate data is the extracted data by the data extraction process depending on whether the number of records of the intermediate data is less than or equal to the number of records of the master data or not. That is, it is considered that the number of records of the extracted data prepared in the extraction process becomes less than or equal to the number of records of the master data, which is an extraction source, in order to extract data, in the data extraction process. For that reason, when the number of records of the intermediate data is less than or equal to the number of records of the master data, the intermediate data has the possibility of being the extracted data. When the number of records of the intermediate data is greater than the number of records of the master data, the intermediate data is not the extracted data.

The reason the determination of Step S24 is performed is that the piece of information of the extracted data extracted from the master data may be all or some of the pieces of information (in the example of master data M1, the items for store name, goods name, and sales amount) of each column of the master data. That is, when the items included in the intermediate data are some or all of the items included in the master data, the intermediate data is considered as the extracted data extracted by the data extraction process. When any of the items included in the intermediate data is an item other than the items included in master data, the intermediate data is not the extracted data extracted by the data extraction process.

As described above, the intermediate data analysis unit 160 performs the determinations of Steps S23 and S24 to appropriately specify the extracted data, which is extracted by the data extraction process, among the intermediate data.

The intermediate data analysis unit 160 repeatedly executes the procedural sequence of FIG. 15 each time when the operation server 200 is executed during the actual operation. As described above, the intermediate data analysis unit 160 may execute the procedural sequence of FIG. 15 relating to the candidate flow registered in the aggregation candidate management table 121 and may not execute the procedural sequence of FIG. 15 relating to the job flow other than the candidate flow.

Figure 16:
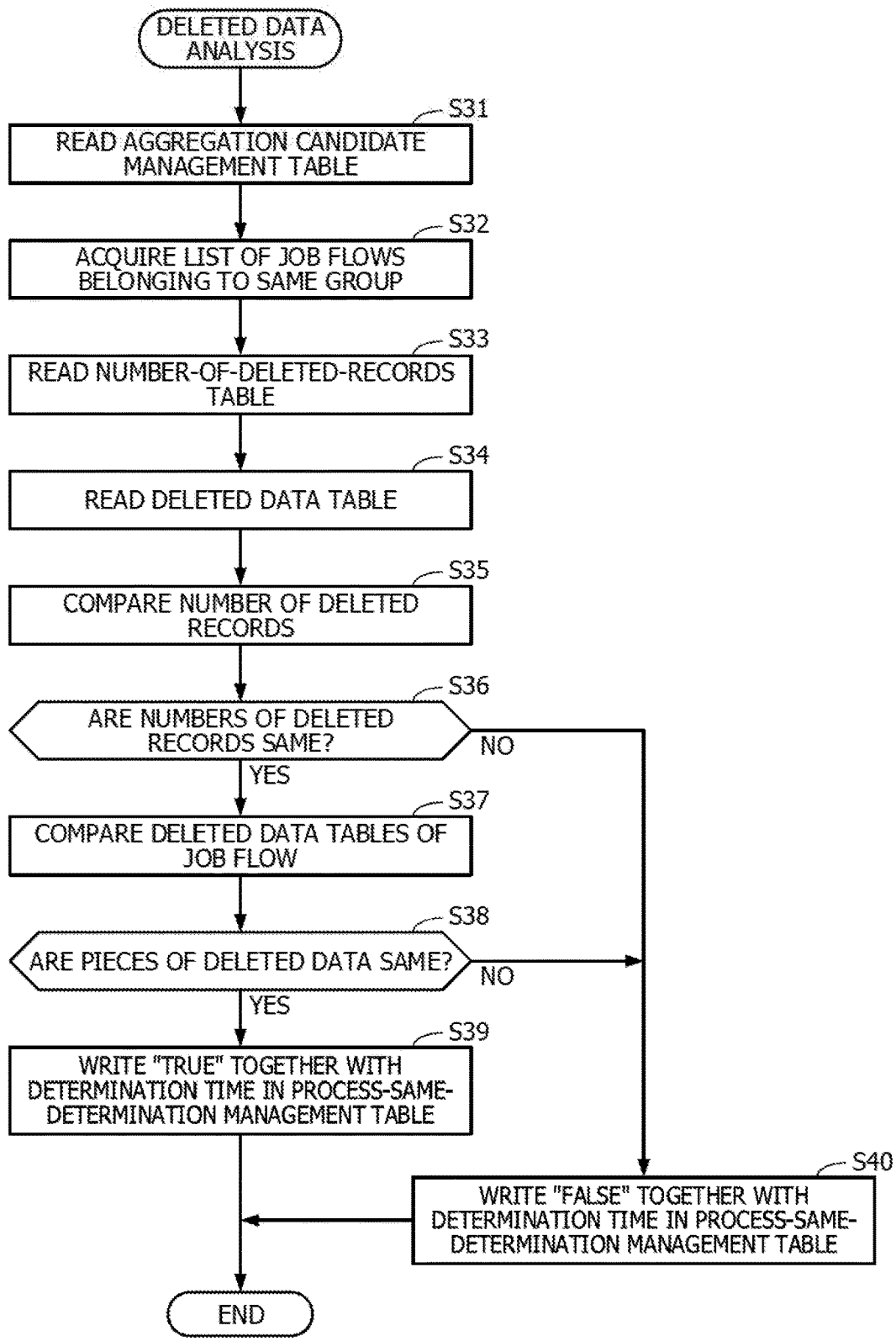
FIG. 16 is a flowchart illustrating an example of a deleted-data analysis process.

FIG. 16 is a flowchart illustrating an example of a deleted-data analysis process. In the following, the procedural sequence illustrated in FIG. 16 will be described in line with step numbers. The procedural sequence indicated in the following corresponds to Step S3 of FIG. 12.

(S31) The deletion data analysis unit 170 reads the aggregation candidate management table 121.

(S32) The deletion data analysis unit 170 acquires a list of job flows (candidate flows) belonging to the same group based on the aggregation candidate management table 121. For example, the deletion data analysis unit 170 acquires the job flows JA, JB, JC, and JD (list of job flows) belonging to the group G1 based on the aggregation candidate management table 121.

(S33) The deletion data analysis unit 170 reads the number-of-deleted-records table 122.

(S34) The deletion data analysis unit 170 references the deleted-data management information 123 and reads the deleted data table of each job flow acquired in Step S32. For example, the deletion data analysis unit 170 reads the deleted data tables 123a, 123b, 123c, and 123d for the job flows JA, JB, JC, and JD. The deletion data analysis unit 170 executes Steps S35 to S40 indicated in the following for each group of the job flows (when a plurality of processing target groups exist, Steps S35 to S40 are repeatedly executed for each group).

(S35) The deletion data analysis unit 170 compares the number of deleted records of respective job flows belonging to a group of interest based on the number-of-deleted-records table 122.

(S36) The deletion data analysis unit 170 determines whether the numbers of deleted records of the respective job flows belonging to the group of interest are the same or not. In a case where the numbers of the deleted records are the same, the process proceeds to Step S37. In a case where the numbers of the deleted records are not the same, the process proceeds to Step S40. In a case where the number of deleted records of all job flows belonging to the group of interest are the same or in a case where the number of deleted records of some of job flows belonging to the group of interest are the same, the deletion data analysis unit 170 causes the process to proceed to Step S37. In the example of the number-of-deleted-records table 122, the job flows JA, JB, and JC of the job flows JA, JB, JC, and JD belonging to the group G1 include the same number of deleted records of "70". In this case, the deletion data analysis unit 170 causes the process to proceed to Step S37.

(S37) The deletion data analysis unit 170 compares contents of the deleted data regarding the job flows (for example, job flows JA, JB, and JC) between which the number of deleted records is the same based on the deleted data table read in Step S34.

(S38) The deletion data analysis unit 170 determines whether the pieces of deleted data are the same in the comparison of Step S37. In a case where the pieces of deleted data are the same, the process proceeds to Step S39. In a case where the pieces of deleted data are not the same, the process is caused to proceed to Step S40. In a case where all job flows between which the numbers of deleted records are the same or in a case some of the job flows between which the numbers of deleted records are the same, the deletion data analysis unit 170 causes the process to proceed to Step S39. Whether the pieces of deleted data are the same or not may be determined by comparing the contents of the deleted data tables of respective job flows. As described above, the item included in the deleted data table may be changed by the job flow. A specific example of a method for determining whether the contents of the deleted data are the same in this case will be described later.

(S39) The deletion data analysis unit 170 writes "TRUE" together with the determination time in the process-same-determination management table 124 regarding the job flow groups between which both the number of deleted records and the content of deleted data are the same. The deletion data analysis unit 170 writes a "FALSE" regarding the job flow other than the job flow group among the job flows belonging to the group of interest. The process is ended.

(S40) The deletion data analysis unit 170 writes a "FALSE" together with the determination time in the process-same-determination management table 124 regarding the job flows belonging to the group of interest.

As in Step S36, a determination whether the numbers of deleted records are the same or not is performed so as to make it possible to narrow the deleted data table which becomes a comparison target, before comparing the contents of the deleted data tables. With this, in Step S37, only the deleted data tables between which the number of deleted records is the same have to be compared and the deleted data tables between which the number of deleted records are different may not be compared. For that reason, a useless determination is not performed and processing cost is suppressed.

In the example of the second embodiment, as described above, the deletion data analysis unit 170 performs the sameness determination on the job flows JA, JB, JC, and JD each time by using the collected results of the pieces of deleted data for a day of the respective job flows JA, JB, JC, and JD. The deletion data analysis unit 170 may discard the piece of deleted data used in the determination performed at this time.

FIGS. 17A, 17B, and 17C are diagrams illustrating an example of a deleted-data comparison method. In FIGS. 17A, 17B, and 17C, a case where a deleted data table 123a of the job flow A is compared with a deleted data table 123e of the job flow JB is illustrated. The deleted data table 123a is different from the deleted data table 123e in that the deleted data table 123a includes three items of a store name, a goods name, and a sales amount while the deleted data table 123e includes two items of the store name and the goods name, and does not include the item of the sales amount (FIG. 17A). In this case, the deletion data analysis unit 170 determines whether the content of both tables are coincident by using setting values of the items included in the table (in this example, deleted data table 123e) of which the number of items is smaller. In the example for the deleted data tables 123a and 123e, the two items of the deleted data table 123e are included in the three items of the deleted data table 123a and thus whether the content of both tables are coincident is determined by the items of the store name and the goods name of the deleted data table 123e. The deletion data analysis unit 170 performs the comparison by extracting the record one by one from the deleted data tables 123a and 123e.

For example, FIG. 17B is an example of a comparison of a record R11 of the deleted data table 123a and a record R21 of the deleted data table 123e. A store name and a goods name of the record R11 are "B" and "Y", respectively. The store name and the goods name of the record R21 are "B" and "Y", respectively. Accordingly, the deletion data analysis unit 170 determines that the records R11 and R21 are coincident.

FIG. 17C is an example of a comparison of a record R12 of the deleted data table 123a and a record R22 of the deleted data table 123e. The store name and the goods name of the record R12 are "B" and "Y1", respectively. The store name and the goods name of the record R22 are "B" and "Y2", respectively. Accordingly, the deletion data analysis unit 170 determines that the records R12 and R22 are different (not coincident).

By the comparison described above, in a case where all records of both deleted data tables are coincident, the deletion data analysis unit 170 determines that both deleted data tables are coincident. In a case where a record which is not coincident between both deleted data tables exists, the deletion data analysis unit 170 determines that both deleted data tables are not coincident.

As described above, for each group of a job flow, the determination results for the sameness between the processes of the job flows are accumulated. For example, in a stage where the determination results of a predetermined number of times worth such as 10 times worth or 20 times worth are accumulated, the job flow aggregation unit 180 executes a job flow aggregation process.

Figure 18:
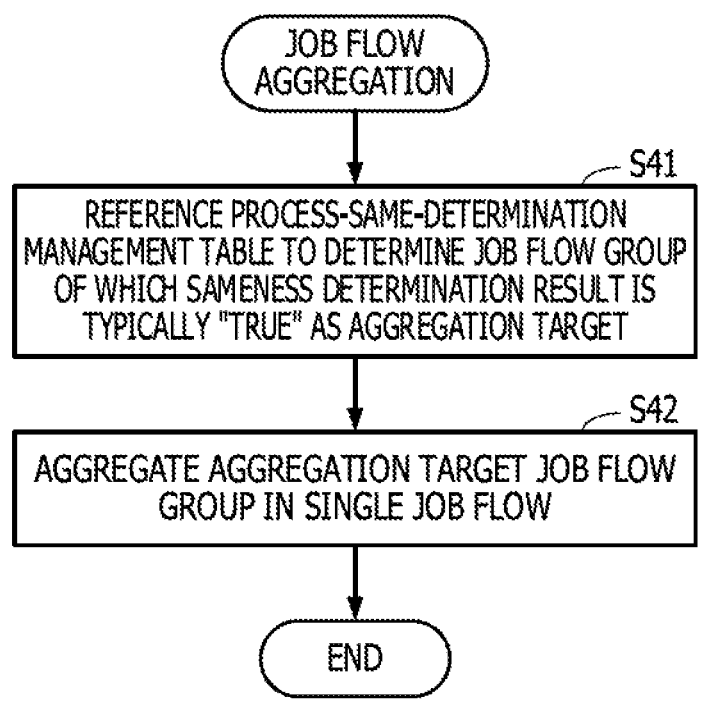
FIG. 18 is a flowchart illustrating an example of a job flow aggregation process.

FIG. 18 is a flowchart illustrating an example of a job flow aggregation process. In the following, the process illustrated in FIG. 18 will be described in line with step numbers. The procedural sequence indicated in the following corresponds to Step S4 of FIG. 12. The job flow aggregation unit 180 repeatedly executes the following procedural sequence for each group.

(S41) The job flow aggregation unit 180 references the process-same-determination management table 124 stored in the management information storage unit 120 to determine the job flow group of which the sameness determination result is typically "TRUE" (that is, determined as a job flow group of being coincident) as an aggregation target.

(S42) The job flow aggregation unit 180 aggregates the aggregation target job flow group determined in a single job flow. For example, in a case where the job flows JA and JC are intended to be aggregated, the job flow aggregation unit 180 changes settings of the job execution schedule such that the business processing which was executed using the definition information of the job flow JC is executed using the definition information of the job flow JA. In this case, the job flow aggregation unit 180 may discard the definition information of the job flow JC. The number of the aggregation target job flows may be two or three or more. The job flow aggregation unit 180 notifies an aggregated result of the job flow to the operation server 200 to reflect the aggregated result into the definition information of the job flow of the operation server 200. The aggregated result of the job flow is also reflected into the operation server 200.

FIG. 19 is a diagram illustrating a specific example of the job flow aggregation process. For example, according to the process-same-determination management table 124 of the group G1, only the "FALSE" (not the same) is recorded in the job flows JB and JD as the determination result while only a "TRUE" (the same) is recorded in the job flows JA and JC as the determination result. In this case, the job flow aggregation unit 180 detects that the processes of the job flows JA and JC are typically the same and determines that the job flows JA and JC are to be aggregated. In this manner, the job flow group regarded as the same may be obtained based on accumulations of the determination results of a plurality of times worth using the deleted data table and thus, the aggregation target job flow group is able to be determined more appropriately.

It is considered that input data and output data of the first job are compared with input data and output data of the second job in order to determine sameness of the processes executed in the first job and the second job. Specifically, when the input data of the first job and the input data of the second job are coincident and the output data of the first job and the output data of the second job are coincident, it is determined that the processes of the first job and the second job are the same. Furthermore, when the input data of the first job and the input data of the second job are not coincident or the output data of the first job and the output data of the second job are not coincident, it is determined that the processes of the first job and the second job are not the same.

In such a way of thinking, it is considered that sameness of the processes executed in the job flow including a plurality of jobs is determined. That is, the input data and the output data of the first job flow are compared with the input data and the output data of the second job flow in order to determine sameness of the first job flow and the second job flow. Specifically, when the input data of the first job flow and the input data of the second job flow are coincident and the output data of the first job flow and the output data of the second job flow are coincident, it is determined that the processes of the first job flow and the second job flow are the same. Furthermore, when the input data of the first job flow and the input data of the second job flow are not coincident or the output data of the first job flow and the output data of the second job flow are not coincident, it is determined that the processes of the first job flow and the second job flow are not the same.

When the method described above is applied to a job flow in which a batch process is performed, a problem may be caused. As described above, the batch process is a combination of three types of an extraction process, a processing process, and a totalization process. In the batch process, processing is advanced in order of the extraction process, the processing process, and the totalization process and the procedural sequence of the processes is not reversed, for example, in a case where the extraction process is executed after being advanced to the processing process. In the processing process and the totalization process, the input data and the output data are correlated due to the nature of the processes and the same output data is not prepared for different input data. In order to explain the problem described above based on the matters described above, the following job flows JX and JY are considered.

Figure 20A:
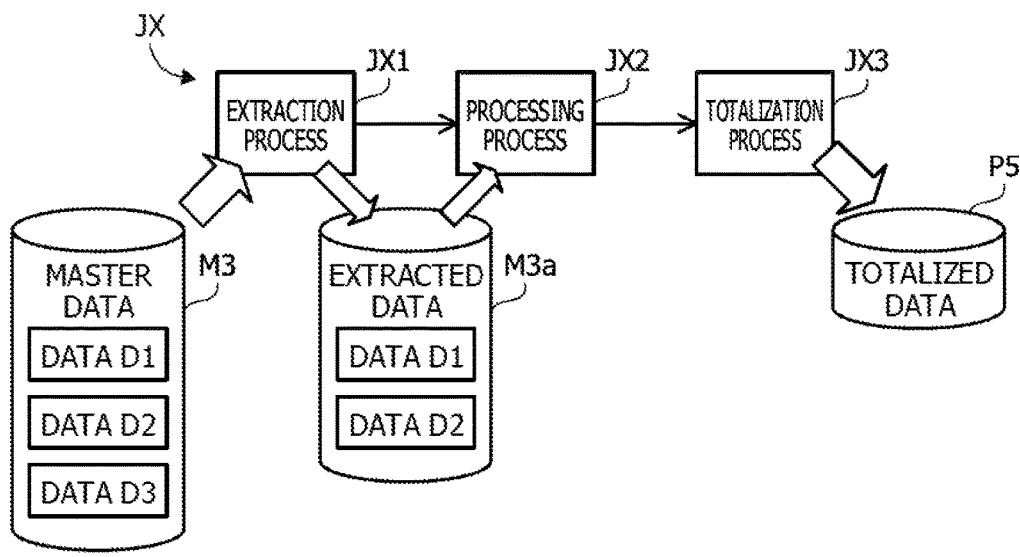
FIGS. 20A and 20B are diagrams illustrating an example (first example) of an extraction process in the job flow.
Figure 20B:
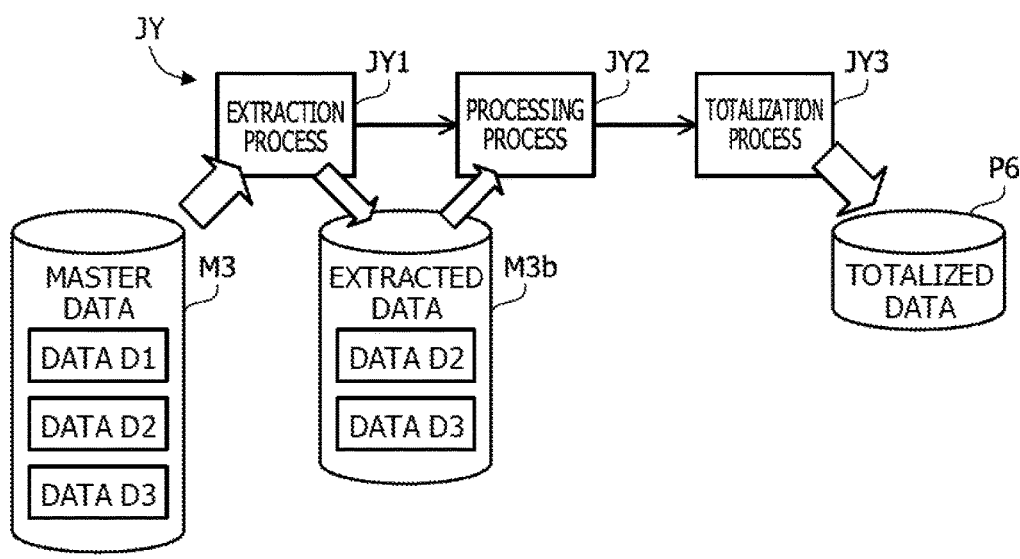

FIGS. 20A and 20B are diagrams illustrating an example (first example) of an extraction process in the job flow. FIG.

20A illustrates a job flow JX. FIG. 20B illustrates a job flow JY. The job flow JX includes jobs JX1, JX2, and JX3. The job JX1 is an extraction process. The job JX2 is a processing process. The job JX3 is a totalization process. The job flow JY includes jobs JY1, JY2, and JY3. The job JY1 is an extraction process. The job JY2 is a processing process. The job JY3 is a totalization process.

The pieces of data input to the job flows JX and JY are both master data M3. The piece of data output by the job flow JX is totalized data P5. The piece of data output by the job flow JY is totalized data P6.

The master data M3 includes data D1, D2, and D3. The job JX1 performs filter processing to exclude the data D3. That is, the job JX1 performs filter processing on the data D1, D2, and D3 of the master data M3 to delete the data D3 and extract the data D1 and D2. Extracted data M3a extracted by the job JX1 includes the data D1 and D2 and does not include the data D3.

On the other hand, the job JY1 performs filter processing to exclude the data D1. That is, the job JY1 performs filter processing on the data D1, D2, and D3 of the master data M3 and extracts the data D2 and D3 obtained by deleting the data D1 from the master data M3. Extracted data M3b extracted by the job JY1 includes the data D2 and D3 and does not include the data D1.

It is considered that a piece of sample data is given to the job flows JX and JY of the batch process as follows.

Figure 21A:
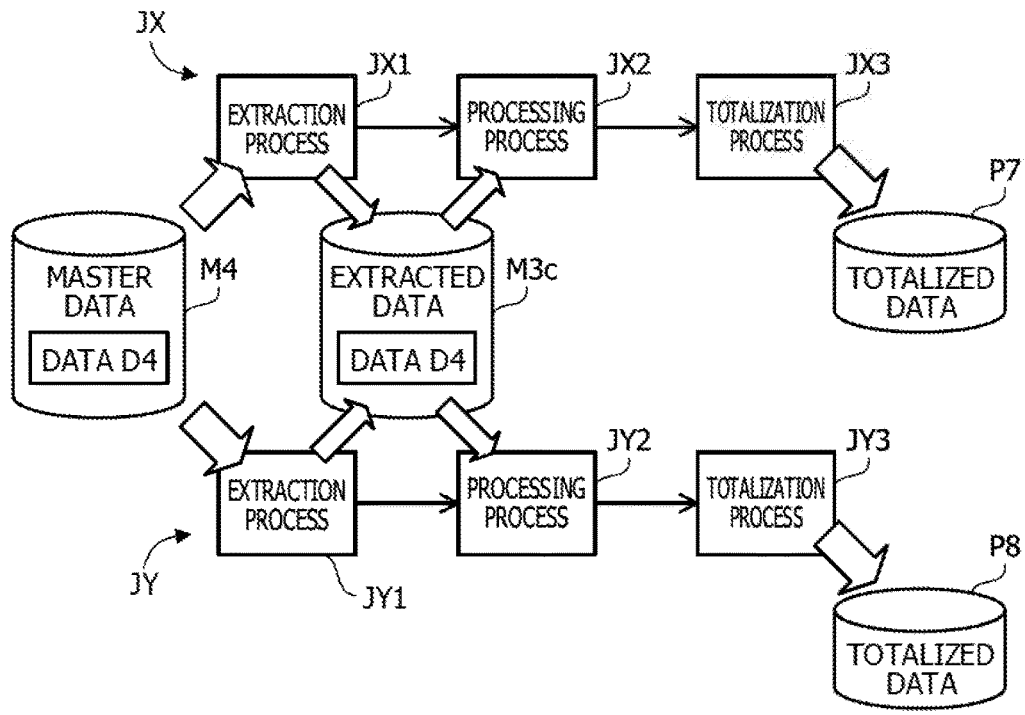
FIGS. 21A and 21B are diagrams illustrating an example (second example) of the extraction process in the job flow.
Figure 21B:
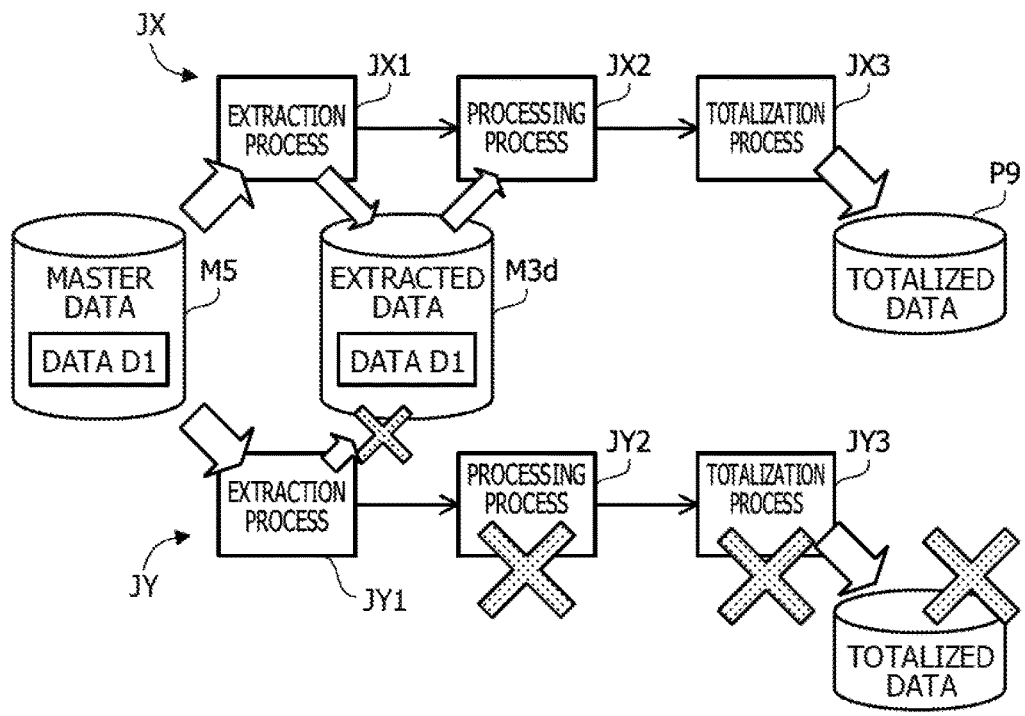

FIGS. 21A and 21B are diagrams illustrating an example (second example) of the extraction process in the job flow. FIG. 21A illustrates an example in which master data M4 is input to each of the job flows JX and JY. The master data M4 includes data D4 (other pieces of data are not included). In this case, the data D4 is not filtered by the jobs JX1 and JY1 and thus a piece of extracted data (in FIG. 21A, is collectively denoted by extracted data M3c) extracted by each of the jobs JX1 and JY1 becomes the data D4.

In this case, it is considered that sameness of the job flows JX and JY is determined by using the master data M4 which is the input data and totalized data P7 and P8 which are output data. Matters that the master data M4 is the input data is common to the job flows JX and JY and thus, when the totalized data P7 and P8 are the same, it is determined that the job flows JX and JY performs the same process.

FIG. 21B illustrates an example in which master data M5 is input to each of the job flows JX and JY. The master data M5 includes data D1 (other pieces of data are not included). In this case, the data D1 is not filtered by the job JX1 and thus extracted data M3d extracted by the job JX1 becomes the data D1. On the other hand, the data D1 is filtered by the job JY1 and thus a piece of extracted data extracted by the job JY1 becomes non-existent (in the job flow JY, a piece of data is not extracted by the job JY1 which is the extraction process). For that reason, subsequent jobs JY2 and JY3 are not performed and a piece of totalized data is not prepared.

It is considered that sameness between the job flows JX and JY is determined by using the master data M5, which is the input data, and totalized data P9 which is the output data. Matters that the master data M5 is the input data is common to the job flows JX and JY. However, the totalized data P9 is prepared in the job flow JX but not in the job flow JY and thus, it is determined that the job flows JX and JY does not perform the same process.

As described above, even in the same job flow, when a piece of sample data used in the input data is changed, a determination result whether the same process is performed in the job flows becomes different. That is, there is a concern that an incorrect evaluation result may be derived depending on an input data for evaluation and it becomes difficult to appropriately determine whether both job flows are the same process. In order to solve the problem described above, it is also considered that the number of samples of the data used as the input data of job flow is increased. However, the business cost for increasing the number of samples becomes problematic. This is because providing multiple suitable samples adapted for an actual environment is not easy without considering various conditions or constraints suitable for the business. On the contrary, it is considered that the determination on the sameness by the comparison of the input/output data of two job flow is performed in the operation environment. This is because a piece of output data may be obtained for various pieces of input data. In the meantime, in such case, the following problems occur.

Figure 22:
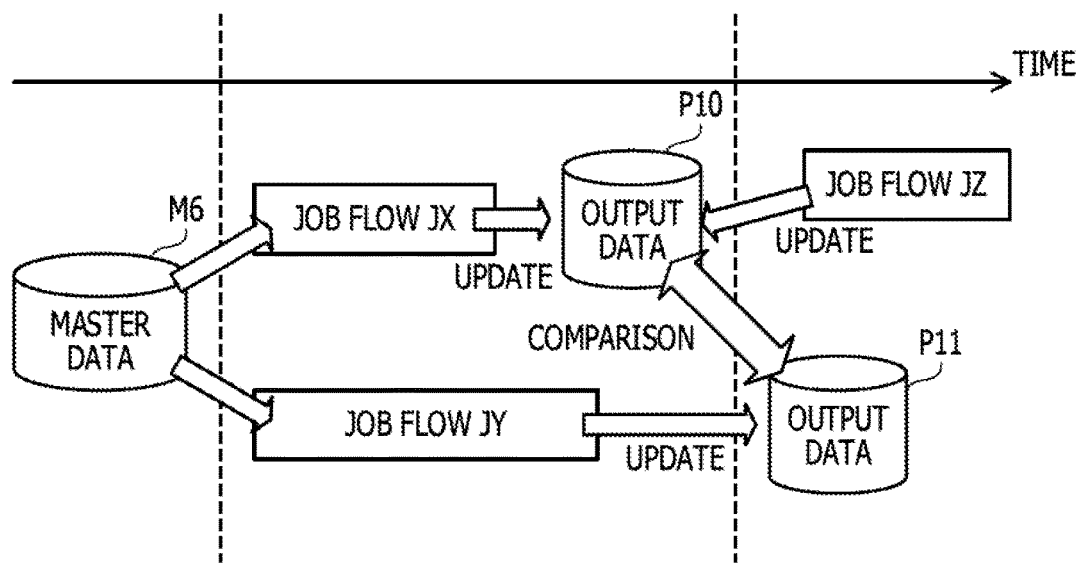
FIG. 22 is a diagram illustrating an example which is problematic when comparing output data in an operation environment.

FIG. 22 is a diagram illustrating an example which becomes problematic when comparing output data in an operation environment. At a certain point of time, the job flow JX receives master data M6 as input and outputs output data P10. A job flow JZ updates the output data P10 immediately after the job flow JX is ended. The job flow JY receives the master data M6 as input and outputs output data P11. The output data P11 is not updated by another job flow. In this case, even when the determination of sameness of the job flows JX and JY is performed by the comparison of the input and output data, it becomes difficult to obtain the appropriate determination result. This is because the output data P10 is immediately updated by the job flow JZ. Even when the output data P10 updated by the job flow JZ is compared with the output data P11, an influence of the job flow JZ extends to the output data P10 and thus, it is inappropriate for the determination of sameness of the job flows JX and JY.

On the contrary, it is also considered that a data size of the totalized data output by the totalization process is relatively small and thus, the totalized data may be copied before being updated. However, the piece of output data of a job flow is used in other business processing and thus, is normally stored in the RDB managed by an RDB management system (RDBMS). The RDB is an information storage area strictly managed as a storage destination of data for a business and has constraints that an operation such as copying of the table into the RDB for the purpose other than business processing is not allowed. Although it is also considered that a piece of data which becomes a determination target is copied to a storage area other than the RDB, it is difficult to grasp timing at which the corresponding data is updated in another business processing. For that reason, lock processing has to be performed on the data in order to reliably copy a piece of correct data (not updated) to a storage location other than the RDB. The lock processing has a risk of significantly influencing on the business processing (for example, suspension of business) and thus, the lock processing is not allowed for a purpose other than the business processing. Accordingly, in the sameness determination process for the process of the job flow, direct use of the output data of the job flow is not realistic in the actual environment.

The analysis server 100 uses the intermediate data (mainly extracted data) prepared in the middle of the job flow. The intermediate data is used only in the job within the job flow in which the intermediate data is prepared but not used by other job flows. Accordingly, the analysis server 100 does not receive an influence of other job flows regarding the combination of certain job flow as described above and suppresses an influence on the RDB managed in the actual environment to appropriately perform the determination of sameness.

In particular, the deleted data is used in the determination of sameness of the job flow so as to make it possible to execute the determination at high speed. The deleted data may often be irregular data such as error data included in the master data or data which becomes non-processing target due to, for example, a business instruction at that time. For that reason, for example, the deleted data normally has a significantly small size which is less than 1% of the total amount of extracted data. As described above, data having a size smaller than that of the master data or the extracted data is used for the comparison to thereby perform the determination process at high speed. Computing resources used for the determination process may be saved.

Furthermore, in the information processing system of the second embodiment, the functions of the analysis server 100 (respective functions of the analysis server 100 illustrated in FIGS. 5 and 6) may be equipped in the operation server 200. In this case, a lot of hardware resources of the operation server 200 which is the asset for business are consumed in order to perform sameness determination processing for the process of the job flow. For that reason, the sameness determination process is not allowed to excessively consume resources of the asset for business and cause hindrance to the actual business. From this, it is desirable that an amount of data as determination materials used in the sameness determination process is relatively small. Also, in this case, the deleted data is used so as to suppress load of resources of the operation server 200 from becoming excessively large and suppress influence on the actual business.

As described above, according to the information processing system of the second embodiment, it is possible to specify aggregatable job flows to be aggregated. In this case, the pieces of deleted data may be compared to determine the sameness in the data extraction process of the job flow so as to make the determination accuracy higher than a case where only the input and output data are compared to determine the sameness of the job flow. The deleted data is used so as to make it possible to suppress an amount of data of the processing target from becoming excessively large and suppress the load of hardware resources for the determination process. Furthermore, it is possible to suppress the amount of data of the comparison target from becoming excessively large and thus, the determination is performed at high speed.

A plurality of job flows performing the common process may be individually defined and used in the operation of the actual business. For example, a case where systems installed respectively in a plurality of sites are incorporated in a single site or a system such as a data center is considered. The information processing system of the second embodiment may be considered as a system prepared as a result of incorporation of a plurality of systems. In this case, when the job flow, which is prepared and executed in the system of each site, is continuously used in a business performed in each site even after being incorporated, a plurality of job flows performing the common process may be generated in a single system after the incorporation. When the plurality of job flows performing the common process are defined in the single system, a problem in a job flow management occurs in the system. For example, when job flow maintenance is performed, if a plurality of job flows performing the common process exist, maintenance is not performed in each job flow but performed for the plurality of job and thus, a maintenance cost may be increased.

It is considered that a plurality of job flows performing the common process is aggregated into a single job flow. When a plurality of job flows is able to be unified, the maintenance cost may be reduced. This is because only a single job flow after the aggregation may be maintained and the plurality of job flows before the aggregation are not managed. When a plurality of job flows performing the common process is not appropriately grasped, it becomes unable to perform a correct aggregation. In the information processing system of the second embodiment, as described above, the determination accuracy of a plurality of job flows performing the common (same) process may be increased and thus, the aggregation of the job flows may be appropriately performed based on the determination result. As described above, the job flows may be aggregated so as to reduce the maintenance cost of the job flow.

Information processing according to the first embodiment may be implemented by causing the operation unit 1*b* to execute a program. Information processing according to the second embodiment may be implemented by causing the processor 101 to execute a program. The program may be recorded in a computer readable recording medium 13.

For example, the computer readable recording medium 13 having recorded the program therein may be distributed to circulate the program. The program may also be stored in another computer to be distributed through a network. The computer, for example, may be executed by storing (installing) the program recorded in the recording medium 13 or the program received from another computer in a storage device such as the RAM 102 or the HDD 103 and reading the program from the storage device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a control program that causes a computer to execute a process, the process comprising:

obtaining, for each of a plurality of job flows to which coincident input data is inputted, data excluded from the coincident input data of each of the plurality of job flows by a data extraction process or information specifying the excluded data, each of the plurality of job flows defining a plurality of processes including the data extraction process to be executed; and determining whether the plurality of job flows whose output data are coincident each other are aggregated or not based on the excluded data or the information specifying the excluded data.

2. The non-transitory computer-readable storage medium according to claim 1, the process comprising:

controlling such that the job flows between which the excluded data are coincident are aggregated or the job flows between which the excluded data are different are not aggregated.

3. The non-transitory computer-readable storage medium according to claim 1, wherein the determining is executed multiple times, the coincident input data of each of the plurality of job flows being different among the multiple times.

4. The non-transitory computer-readable storage medium according to claim 1, the process comprising:
  determining whether the plurality of job flows whose output data are coincident each other are aggregated or not based on a number of records included in the excluded data.

5. The non-transitory computer-readable storage medium according to claim 1, wherein
  the excluded data is difference data included in the coincident input data but not included in extracted data extracted from the coincident input data by the data extraction process.

6. The non-transitory computer-readable storage medium according to claim 5, the process further comprising:
  specifying the extracted data based on a comparison between a data item of intermediate data output by a job included in each of the plurality of job flows and a data item of the coincident input data.

7. A control device comprising:
  a memory; and
  a processor coupled to the memory and the processor configured to:
    store, in the memory, for each of a plurality of job flows to which coincident input data is inputted, data excluded from the coincident input data of each of the plurality of job flows by a data extraction process or information specifying the excluded data, each of the plurality of job flows defining a plurality of processes including the data extraction process to be executed; and
    determine whether the plurality of job flows whose output data are coincident each other are aggregated or not based on the excluded data or the information specifying the excluded data.

8. A control method executed by a computer, the control method comprising:
  obtaining, for each of a plurality of job flows to which coincident input data is inputted, data excluded from the coincident input data of each of the plurality of job flows by a data extraction process or information specifying the excluded data, each of the plurality of job flows defining a plurality of processes including the data extraction process to be executed; and
  determining whether the plurality of job flows whose output data are coincident each other are aggregated or not based on the excluded data or the information specifying the excluded data.

* * * * *